US009127112B2

(12) United States Patent
Kosaka et al.

(10) Patent No.: US 9,127,112 B2
(45) Date of Patent: Sep. 8, 2015

(54) HYDROGENATED BLOCK COPOLYMER, RESIN COMPOSITION, FILM AND CONTAINER

(71) Applicant: MITSUBISHI CHEMICAL CORPORATION, Chiyoda-ku (JP)

(72) Inventors: Naoyuki Kosaka, Kanagawa (JP); Toshihisa Ishihara, Mie (JP); Kenjiro Takayanagi, Mie (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 0 days.

(21) Appl. No.: 14/230,905

(22) Filed: Mar. 31, 2014

(65) Prior Publication Data

US 2014/0213728 A1    Jul. 31, 2014

Related U.S. Application Data

(63) Continuation of application No. PCT/JP2012/074950, filed on Sep. 27, 2012.

(30) Foreign Application Priority Data

Sep. 29, 2011   (JP) ................... 2011-214648
Jul. 18, 2012   (JP) ................... 2012-159631
Jul. 18, 2012   (JP) ................... 2012-159632
Jul. 18, 2012   (JP) ................... 2012-159633

(51) Int. Cl.
| | |
|---|---|
| *C08L 53/00* | (2006.01) |
| *C08F 293/00* | (2006.01) |
| *C08F 297/08* | (2006.01) |
| *C08L 23/14* | (2006.01) |
| *C08L 45/00* | (2006.01) |
| *C08F 8/04* | (2006.01) |
| *C08F 297/00* | (2006.01) |
| *C08L 23/22* | (2006.01) |
| *C08L 53/02* | (2006.01) |
| *C08L 65/00* | (2006.01) |

(52) U.S. Cl.
CPC ................. *C08F 293/00* (2013.01); *C08F 8/04* (2013.01); *C08F 297/00* (2013.01); *C08F 297/08* (2013.01); *C08L 23/14* (2013.01); *C08L 23/22* (2013.01); *C08L 45/00* (2013.01); *C08L 53/005* (2013.01); *C08L 53/025* (2013.01); *C08L 65/00* (2013.01); *C08G 2261/3325* (2013.01); *C08G 2261/418* (2013.01); *C08G 2261/724* (2013.01)

(58) Field of Classification Search
USPC ........ 525/89, 95, 97, 99
See application file for complete search history.

(56) References Cited

U.S. PATENT DOCUMENTS

| 6,028,147 | A | 2/2000 | Ogawa et al. | |
|---|---|---|---|---|
| 2001/0048991 | A1 | 12/2001 | Martin et al. | |
| 2002/0137835 | A1* | 9/2002 | Abraham et al. | ............. 524/487 |
| 2003/0092843 | A1* | 5/2003 | von Hellens | ................... 525/192 |
| 2003/0158307 | A1 | 8/2003 | Tsukuda et al. | |
| 2004/0239735 | A1 | 12/2004 | Mashita et al. | |
| 2004/0260028 | A1 | 12/2004 | Sone | |
| 2009/0117379 | A1 | 5/2009 | Toyoshima et al. | |
| 2011/0184082 | A1 | 7/2011 | Wright et al. | |

FOREIGN PATENT DOCUMENTS

| CA | 2 373 712 A1 | 11/2000 |
|---|---|---|
| CN | 1363090 A | 8/2002 |
| CN | 1558930 A | 12/2004 |
| JP | 01-317728 | 12/1989 |
| JP | 05-009389 | 1/1993 |
| JP | 07-216152 A | 8/1995 |
| JP | 11-100420 | 4/1999 |
| JP | 2002-540229 | 11/2002 |
| JP | 2003-502470 | 1/2003 |
| JP | 2003-534412 | 11/2003 |
| JP | 2005-105164 | 4/2005 |
| JP | 2005-187722 | 7/2005 |
| JP | 2007-002886 | 1/2007 |
| JP | 2007-16217 | 1/2007 |
| JP | 2007-099846 | 4/2007 |
| TW | 506990 B | 10/2002 |
| WO | 00/56782 | 9/2000 |
| WO | 00/77094 | 12/2000 |
| WO | 01/92412 | 12/2001 |
| WO | 03/018656 | 3/2003 |
| WO | WO 2011/094094 A1 | 8/2011 |

OTHER PUBLICATIONS

International Search Report issued Dec. 25, 2012 in PCT/JP2012/074950 filed Sep. 27, 2012.
Combined Taiwanese Office Action and Search Report issued Nov. 14, 2014 in Patent Application No. 102136174 (with English language translation).
Extended European Search Report issued Jan. 23, 2015, in European Patent Application No. 12837525.0 filed Sep. 27, 2012.

(Continued)

*Primary Examiner* — Jeffrey Mullis
(74) *Attorney, Agent, or Firm* — Oblon, McClelland, Maier & Neustadt, L.L.P.

(57) ABSTRACT

The present invention provides a hydrogenated block copolymer which has an excellent balance in a transparency, optical property, flexibility, mechanical property, moldability, heat resistance, gas barrier property, low moisture absorbency and non-adsorptive property of chemical. Also, the present invention has an object to provide a resin composition containing the hydrogenated block copolymer as a resin component, and a film and container containing the composition. The present invention relates to a hydrogenated block copolymer containing a Block A of a hydrogenated vinyl aromatic polymer and a Block B of a polymer containing isobutylene.

16 Claims, No Drawings

(56) References Cited

OTHER PUBLICATIONS

Aoyama et al, "Development of completely saturated styrene-isobutylene thermoplastic elastomers and damping property of their polypropylene-sandwiched moldings", Seikei Kako, vol. 16, No. 4, Jan. 1, 2004, pp. 228-232, XP055161451,• ISSN: 0915-4027 (w/ partial English translation).

Office Action issued Jun. 1, 2015, in Chinese Patent Application No. 201280047239.3 (w/ English translation).

* cited by examiner

HYDROGENATED BLOCK COPOLYMER, RESIN COMPOSITION, FILM AND CONTAINER

TECHNICAL FIELD

The present invention relates to a hydrogenated block copolymer which has an excellent balance in a transparency, optical property, flexibility, mechanical property, moldability, heat resistance, gas barrier property, low moisture absorbency and non-adsorptive property of chemical. The present invention further relates to a resin composition containing the hydrogenated block copolymer as a resin component, and a film and a container containing the composition.

BACKGROUND ART

As a material which is excellent in the gas barrier property, transparency, flexibility and non-adsorptive property of chemical, a block copolymer of a vinyl aromatic compound such as styrene and isobutylene is conventionally known and a production method thereof was also proposed (Patent Document 6).

Further, in order to eliminate the defects in that the moldability is bad and the surface appearance is not good when molding by injection molding is conducted, it is known to form a composition with a polyolefin such as polypropylene and a softener such as paraffin oil (Patent Documents 1 and 2).

In addition, a vinyl aromatic polymer hydride obtained by hydrogenating the aromatic ring of a vinyl aromatic polymer such as polystyrene is known, and it is known that the vinyl aromatic polymer hydride can be used as an optical lens or an optical disk because the low birefringence property is excellent (Patent Document 3). On the other hand, it is known that a vinyl aromatic copolymer hydride excellent in the flexibility is obtained by hydrogenating a block copolymer of a vinyl aromatic compound and a conjugate diene compound (Patent Documents 4, 5, 7 and 8).

PRIOR ART DOCUMENTS

Patent Documents

Patent Document 1: JP-A-2005-187722
Patent Document 2: JP-A-2005-105164
Patent Document 3: JP-A-1-317728
Patent Document 4: JP-A-2002-540229
Patent Document 5: JP-A-2003-502470
Patent Document 6: JP-A-11-100420
Patent Document 7: JP-A-2007-16217
Patent Document 8: WO2003/18656

SUMMARY OF THE INVENTION

Problems that the Invention is to Solve

According to the detailed study of the present inventors, the copolymer described in Patent Document 6 above was found to have defects in that the moldability was bad and the surface appearance was not good when molding by injection molding was conducted. Further, Patent Document 1 or 2 above for preventing the defects of Patent Document 6 above had problems in that the flexibility, transparency and gas barrier property deteriorated by the incorporation of a polyolefin or a softener. In addition, the vinyl aromatic polymer hydride described in Patent Document 3 above has defects of brittleness although the elastic modulus is high. Furthermore, regarding the material obtained by hydrogenating a block copolymer of a vinyl aromatic compound and a conjugate diene compound described in Patent Documents 4, 5, 7 and 8 above, the transparency is sometimes slightly inferior to that of a vinyl aromatic polymer hydride and there are defects in that the balance with the gas barrier property cannot be achieved at the same time.

The present invention aims to provide a hydrogenated block copolymer which has an excellent balance in a transparency, optical property, flexibility, mechanical property, moldability, heat resistance, gas barrier property, low moisture absorbency and non-adsorptive property of chemical. The present invention also aims to provide a resin composition containing the hydrogenated block copolymer as a resin component, and a film and a container containing the composition.

Means for Solving the Problems

The present inventors made an intensive investigation to solve the above problems, found that the above problems can be solved by hydrogenating a vinyl aromatic block copolymer having a specific composition and thus completed the present invention.

That is, the gist of the present invention is the following [1] to [17].

[1] A hydrogenated block copolymer which comprises a hydrogenated vinyl aromatic polymer block A and a block B of a polymer mainly containing isobutylene.
[2] The hydrogenated block copolymer described in the item [1], which has a weight average molecular weight of 10,000 or more and 200,000 or less.
[3] The hydrogenated block copolymer described in the item [1] or [2], wherein the hydrogenated vinyl aromatic polymer block A is a hydrogenated polystyrene block in which the aromatic ring is hydrogenated.
[4] The hydrogenated block copolymer described in any one of the items [1] to [3], wherein the hydrogenation rate of the aromatic ring of the hydrogenated vinyl aromatic polymer block A is 50% by mol or more.
[5] The hydrogenated block copolymer described in any one of the items [1] to [4], wherein the block B of the polymer mainly containing isobutylene contains 70% by mass or more of isobutylene as a monomer component.
[6] The hydrogenated block copolymer described in any one of the items [1] to [5], which comprises two blocks of the hydrogenated vinyl aromatic polymer block A and one block of the block B of the polymer mainly containing isobutylene.
[7] The hydrogenated block copolymer described in any one of the items [1] to [6], wherein the content ratio of the hydrogenated vinyl aromatic polymer block A based on the total mass of the hydrogenated block copolymer is 40% by mass or less.
[8] A resin composition which comprises the hydrogenated block copolymer described in any one of the items [1] to [7].
[9] The resin composition described in the item [8], which further comprises a polyolefin containing propylene as a main component.
[10] The resin composition described in the item [9], wherein the polyolefin containing propylene as a main component is a copolymer of propylene and at least one of ethylene and an olefin having 4 to 8 carbon atoms.
[11] The resin composition described in the item [9] or [10], wherein the content of the hydrogenated block copolymer is 10 to 90% by mass and the content of the polyolefin containing propylene as a main component is 90 to 10% by mass.

[12] The resin composition described in the item [8], which further comprises at least one amorphous polyolefin selected from a copolymer of ethylene and a cyclic olefin and a hydrogen additive of a ring-opened polymer of a cyclic olefin.

[13] The resin composition described in the item [12], wherein the content of the hydrogenated block copolymer is 5 to 90% by mass and the content of the amorphous polyolefin is 95 to 10% by mass.

[14] The resin composition described in the item [8], which further comprises at least one hydrogenated vinyl aromatic block copolymer selected from a hydrogenated vinyl aromatic polymer and a hydrogenated block copolymer having a hydrogenated vinyl aromatic polymer block and a block of a polymer mainly containing a hydrogenated conjugate diene.

[15] The resin composition described in the item [14], wherein the content of the hydrogenated block copolymer described in any one of the items 1 to 7 is 5 to 90% by mass and the content of the hydrogenated vinyl aromatic block copolymer is 95 to 10% by mass.

[16] A film which comprises the resin composition described in any one of the items [8] to [15].

[17] A container which comprises the resin composition described in any one of the items [8] to [15].

Advantage of the Invention

According to the present invention, a hydrogenated block copolymer which has an excellent balance in a transparency, optical property, flexibility, mechanical property, moldability, heat resistance, gas barrier property, low moisture absorbency and non-adsorptive property of chemical, a resin composition containing the hydrogenated block copolymer as a resin component, and a film and a container containing the composition are provided.

Mode for Carrying out the Invention

Although the present invention is explained in detail below, the present invention is not limited to the following explanation and can be carried out by arbitrarily modifying the invention in the range which does not go beyond the gist of the present invention.

In the present description, "% by mass" and "% by weight", and "part by mass" and "part by weight" are synonyms, respectively.

[Hydrogenated Block Copolymer]

The hydrogenated block copolymer of the present invention is characterized by having a hydrogenated vinyl aromatic polymer block A and a block B of a polymer mainly containing isobutylene.

As the monomeric vinyl aromatic compound before hydrogenation which constitutes the hydrogenated vinyl aromatic polymer block A of the hydrogenated block copolymer of the present invention, those in which a vinyl group is bonded to an aromatic ring such as benzene ring, naphthalene ring, anthracene ring, fluorene ring and phenanthrene ring are mentioned, and a substituent other than a vinyl group may be bonded to this aromatic ring. Specifically, styrene, α-methylstyrene, 2-methylstyrene, 3-methylstyrene, 4-methylstyrene, 2,4-dimethylstyrene, 2,4-diisopropylstyrene, 4-t-butylstyrene, 5-t-butyl-2-methylstyrene, 4-monochlorostyrene, 4-chloromethyl styrene, 4-hydroxymethylstyrene, 4-t-butoxystyrene, dichlorostyrene, 4-monofluorostyrene, 4-phenyl styrene, vinyl naphthalene, vinyl anthracene and the like are mentioned; styrene, α-methylstyrene, 4-methylstyrene, 4-t-butylstyrene, 4-chloromethylstyrene and vinyl naphthalene are preferably used; and styrene, α-methylstyrene, 4-methylstyrene and 4-t-butylstyrene are further preferably used. Styrene is most preferably used. A kind of the vinyl aromatic compounds may be used alone or two or more kinds thereof may be used in combination.

Although the hydrogenated vinyl aromatic polymer block A is generally a block constituted by a hydrogenated vinyl aromatic compound alone as the monomer, a monomer component other than a vinyl aromatic compound may be contained with a ratio of 50% by mass or less based on the total weight of the hydrogenated vinyl aromatic polymer block A for example, as long as the aim of the present invention is not impaired.

On the other hand, the block B of the polymer mainly containing isobutylene contains isobutylene as a monomer component with a ratio of more than 50% by mass, preferably 55% by mass or more, more preferably 70% by mass or more and further preferably 80 to 100% by mass based on the total weight of the block B of the polymer mainly containing isobutylene; and another monomer may be copolymerized in the above range. By containing isobutylene in the block B of the polymer mainly containing isobutylene as a monomer component in the above range, a hydrogenated block copolymer which has an excellent balance in a transparency, optical property, flexibility, mechanical property, gas barrier property, low moisture absorbency and non-adsorptive property of chemical is obtained.

The "polymer mainly containing isobutylene" means that more than 50% by mass of isobutylene is contained based on the total weight of the block B.

When the block B of the polymer mainly containing isobutylene contains a monomer component other than isobutylene, the other monomer is not particularly limited as long as it is a monomer which can be cation-polymerized with isobutylene and a kind or two or more kinds of the above vinyl aromatic compounds, aliphatic olefins, dienes, vinyl ethers, β-pinenes and the like are mentioned.

The hydrogenated block copolymer of the present invention has one or more segments A (the hydrogenated vinyl aromatic polymer block A) and one or more segments B (the block B of the polymer mainly containing isobutylene), the combination thereof is not particularly limited as long as the effect of the present invention can be obtained, and structures such as A-B, A-(B-A)$_n$, (A-B)$_m$, B-A-(B-A)$_n$-B (here, n represents an integer of 1 or larger and m represents an integer of 2 or larger) and the like are specifically mentioned.

Among them, it is preferable that two or more segments A and one or more segments B are contained to obtain the effect of the present invention, and those having a structure of A-(B-A)$_n$, especially A-B-A, are further preferable among them.

Further, the molecular structure of the hydrogenated block copolymer of the present invention may be linear, branched or radial or an arbitrary combination thereof.

The content of the hydrogenated vinyl aromatic polymer block A of the hydrogenated block copolymer of the present invention is preferably 5% by mass or more, more preferably 10% by mass or more and further preferably 15% by mass or more, and preferably 95% by mass or less, more preferably 80% by mass or less, further preferably 60% by mass or less and particularly preferably 40% by mass or less. When the content of the hydrogenated vinyl aromatic polymer block A of the hydrogenated block copolymer is the upper limit value above or less, the flexibility and the elasticity are excellent and the impact resistance tends to be excellent, while the heat resistance tends to be excellent when the content is the lower limit value above or more.

In this regard, the hydrogenated block copolymer of the present invention may be any copolymer having the hydrogenated vinyl aromatic polymer block A and the block B of the polymer mainly containing isobutylene, and may have a polymer or copolymer block C other than the hydrogenated vinyl aromatic polymer block A and the block B of the polymer mainly containing isobutylene. In this case, as the other block C, for example, a polymer or copolymer block in which the content of isobutylene is less than 50% by mass in the block B of the polymer mainly containing isobutylene, and a polymer or copolymer block comprising a kind or two or more kinds of aliphatic olefins, dienes, vinyl ethers and β-pinenes are mentioned.

In this regard, however, when the content of the other block C in the hydrogenated block copolymer of the present invention is too high, the effect of the hydrogenated block copolymer of the present invention by containing the hydrogenated vinyl aromatic polymer block A and the block B of the polymer mainly containing isobutylene may be impaired. Thus, when the hydrogenated block copolymer of the present invention contains the other block C, the content thereof is preferably 40% by mass or less and particularly preferably 20% by mass or less based on the total weight of the hydrogenated block copolymer.

As the production method for the hydrogenated block copolymer of the present invention, any production method may be used as long as the structure above is obtained. For example, the hydrogenated block copolymer can be obtained by hydrogenating the aromatic ring of a vinyl aromatic block copolymer obtained by conducting cation polymerization in an organic solvent using a Lewis acid catalyst and the like, by the method described in Patent Document 6 above (JP-A-11-100420).

The hydrogenation method, the reaction form and the like of the aromatic ring of the vinyl aromatic block copolymer are not particularly limited and may be conducted according to a known method, but hydrogenation method which can increase the hydrogenation rate and causes less polymer-chain cleavage reaction is preferable. As such preferable hydrogenation method, a method conducted using a catalyst containing at least a metal selected from nickel, cobalt, iron, titanium, rhodium, palladium, platinum, ruthenium, rhenium and the like is mentioned. As the hydrogenation catalyst, both a heterogeneous catalyst and a homogeneous catalyst can be used and the hydrogenation reaction is preferably conducted in an organic solvent.

The heterogeneous catalyst can be used in the form of a metal or a metal compound or by supporting on an appropriate carrier. As the carrier, for example, activated carbon, silica, alumina, calcium carbonate, titania, magnesia, zirconia, diatom earth, silicon carbide, calcium fluoride and the like are mentioned. A kind thereof may be used alone or two or more kinds thereof may be used in combination. The supporting amount of the catalyst component is generally 0.1% by mass or more and preferably 1% by mass or more, and generally 60% by mass or less and preferably 50% by mass or less based on the total amount of the catalyst component and the carrier.

As the homogeneous catalyst, a catalyst in which a metal compound such as nickel, cobalt, titanium and iron and an organic metal compound such as organoaluminum and organolithium are combined; an organic metal complex such as rhodium, palladium, ruthenium, rhenium, titanium, zirconium and hafnium and the like may be used.

As the metal compound above, acetylacetone salt, naphthenate, cyclopentadienyl compound, cyclopentadienyl dichloro compound and the like of each metal are used. As the organoaluminum, alkylaluminum such as triethylaluminum and triisobutylaluminum; halogenated alkylaluminum such as diethylaluminum chloride and ethylaluminum dichloride; hydrogenated alkylaluminum such as diisobutylaluminum halide and the like are used.

As the organic metal complex, γ-dichloro-π-benzene complex, dichloro-tris(triphenylphosphine) complex, hydride-chloro-tris(triphenylphosphine) complex and the like of each metal above are mentioned.

A kind of these hydrogenation catalysts may be used alone or two or more kinds thereof may be used in combination. The amount of the hydrogenation catalyst used is generally 0.001 parts by mass or more, preferably 0.005 parts by mass or more and more preferably 0.01 parts by mass or more, and generally 50 parts by mass or less, preferably 30 parts by mass or less and more preferably 15 parts by mass or less, as the catalyst effective content per 100 parts by mass of the vinyl aromatic block copolymer.

The hydrogenation reaction is preferably conducted using a saturated hydrocarbon solvent such as cyclohexane, methylcyclohexane, n-octane, decalin, tetralin and naphtha or an ether solvent such as tetrahydrofuran as the solvent, under a pressure of 5 to 25 MPa and at a temperature of 100 to 200° C. The amount of the solvent used is not particularly limited, but the amount is generally 100 parts by mass or more and 1,000 parts by mass or less based on 100 parts by mass of the vinyl aromatic block copolymer.

The hydrogenation rate of the aromatic ring of the vinyl aromatic block copolymer is preferably 50% by mol or more, more preferably 80% by mol or more and further preferably 90% by mol or more. When the hydrogenation rate is the lower limit value above or more, the transparency, heat resistance and moldability are excellent. The hydrogenation rate of the aromatic ring can be calculated, for example by $^1$H-NMR from the integral value of the peak derived from the aliphatic component around 0.5 to 2.5 ppm and the peak derived from the aromatic ring around 6.0 to 8.0 ppm.

The method for recovering the hydrogenated block copolymer after the completion of the hydrogenation reaction above is not particularly limited. As the recovery method, known methods such as steam coagulation method for removing the hydrogenation catalyst residue generally by a method such as filtration and centrifugal separation and then removing the solvent by steam stripping from the solution in which the hydrogenated block copolymer is dissolved, direct solvent-removal method for removing the solvent under reduced pressure under heating, coagulation method for precipitating and coagulating the hydrogenated block copolymer by pouring a solution to a poor solvent of the hydrogenated block copolymer such as methanol, ethanol, isopropyl alcohol, water, acetone, methylethyl ketone and ethyl acetate can be adopted.

The polystyrene-conversion weight average molecular weight (Mw) of the hydrogenated block copolymer of the present invention, which is measured by gel permeation chromatography (GPC) using tetrahydrofuran as the solvent, is preferably 10,000 or more, more preferably 30,000 or more and further preferably 50,000 or more, and preferably 200,000 or less, more preferably 150,000 or less and further preferably 130,000 or less. When the Mw of the hydrogenated block copolymer is the lower limit value above of more, the mechanical strength, heat resistance, and moldability of the compact obtained become excellent, while the melt viscosity during processing decreases and the moldability tends to be excellent when the Mw is the upper limit value above or less.

Although the molecular weight distribution of the hydrogenated block copolymer of the present invention can be appropriately determined depending on the intended use, the ratio of the polystyrene-conversion Mw measured by GPC above and the number average molecular weight (Mn) (Mw/

Mn) is preferably 4 or less, more preferably 3 or less and particularly preferably 2 or less. When the Mw/Mn is the upper limit value above or less, a compact excellent in a moldability, heat resistance, transparency and the like is likely to be obtained, which is preferable.

Regarding the hydrogenated block copolymer of the present invention, the lower limit of the melt flow rate (MFR) at 230° C. (nozzle diameter 2 mm) is generally 0.01, preferably 0.1, more preferably 0.5 and most preferably 1, and the upper limit of the MFR is generally 500, preferably 200, more preferably 100 and most preferably 50. When the MFR is the lower limit value above or more, the production with a viscosity which is appropriate for molding and production is easy, while the moldability during processing is excellent and the mechanical property of a product is likely to be sufficient when the MFR is the upper limit value above or less, which is preferable.

The injection moldability and the transparency of the hydrogenated block copolymer of the present invention can be evaluated by the total haze and internal haze values. In particular, the total haze reflects the surface asperity (roughness) of a copolymer and thus can evaluate the injection moldability. As the measurement method, the method described in the Examples can be used. When the total haze is measured by the method described in the Examples, the total haze of the hydrogenated block copolymer of the present invention is preferably 30% or less and more preferably 25% or less in view of the surface asperity. Further, there is no lower limit, and a smaller value is preferable.

The internal haze of the hydrogenated block copolymer of the present invention is preferably 10% or less and more preferably 8% or less in view of the transparency. Further, there is no lower limit, and a smaller value is preferable.

The A hardness of the hydrogenated block copolymer of the present invention can be appropriately adjusted depending on the use.

As the measurement method, the method described in the Examples can be used. The A hardness measured by the method above is preferably 15 or more and more preferably 30 or more. Further, the A hardness is preferably 99 or less and more preferably 97 or less. When the A hardness is the lower limit value above or more, a compact excellent in the moldability and heat resistance tends to be able to be obtained, while a compact excellent in the flexibility and impact resistance tends to be easily obtained when the A hardness is the upper limit value above or less.

The gas barrier property of the hydrogenated block copolymer of the present invention is preferably 5 g/m$^2$·24 h or less and more preferably 3 g/m$^2$·24 h or less when the gas barrier property is measured by the method described in the Examples. Further, there is no lower limit, and a smaller value is preferable. When the gas barrier property is the upper limit value above or less, the gas barrier property (water vapor barrier property) tends to be excellent.

[Resin Composition]

The resin composition of the present invention contains the hydrogenated block copolymer of the present invention and may be a resin composition containing the hydrogenated block copolymer of the present invention, other resin components, various additives and the like if necessary.

The hydrogenated block copolymer of the present invention is sometimes called "hydrogenated block copolymer (X)" below.

As the other resin component (Y) contained in the resin composition of the present invention, ethylene.α-olefin copolymers such as ethylene.vinyl acetate copolymer, ethylene.acrylic acid copolymer, ethylene.methacrylic acid copolymer, ethylene.acrylic ester copolymer and ethylene.methacrylic ester copolymer, polyolefin resins such as polyethylene, polypropylene, polybutene-1 resin, polyolefin having amorphous property, polyphenylene ether resins, polyamide resins such as nylon 6 and nylon 66, aramid resins, aromatic polyester resins such as polyethylene terephthalate and polybutylene terephthalate, aliphatic polyester resins such as polylactic acid, polybutylene succinate and polycaprolactone, polycarbonate resins, polyarylate resins, modified polyphenylene oxide resins, polysulfone resins, polyphenylenesulfide resins, polyethersulfone resins, polyetherketone resins, polyetheretherketone resins, polyimide resins, polyoxymethylene resins such as polyoxymethylene homopolymer and polyoxymethylene copolymer, polymethylmethacrylate resins, silicon-containing soft polymers such as dimethyl polysiloxane, diphenyl polysiloxane and dihydroxy polysiloxane, vinyl aromatic polymers such as polystyrene, ethylene elastomers such as ethylene propylene copolymer rubber (EPM), ethylene.propylene.unconjugated diene copolymer rubber (EPDM), ethylene.butene copolymer rubber (EBM) and ethylene.propylene.butene copolymer rubber, styrene elastomers such as styrene-butadiene-styrene block copolymer, styrene-isoprene-styrene block copolymer, styrene-ethylene/butylene-styrene block copolymer and styrene-ethylene/propylene-styrene block copolymer, polybutadiene, hydrogenated vinyl aromatic polymers, other hydrogenated vinyl aromatic block copolymers containing a hydrogenated styrene/butadiene or styrene/isoprene block copolymer, cycloolefin polymers, cycloolefin copolymers and the like are mentioned. A kind thereof may be used alone or two or more kinds thereof may be used in combination.

Among them, hydrogenated vinyl aromatic polymers, hydrogenated vinyl aromatic block copolymers, cycloolefin polymers, cycloolefin copolymers and polyolefin resins are preferable because they have an excellent balance in a transparency, heat resistance, gas barrier property and non-adsorptive property of chemical.

[Resin Composition of Hydrogenated Block Copolymer (X) and Polyolefin Containing Propylene as Main Component (Y-1)]

Among polyolefin resins, a polyolefin containing propylene as a main component (Y-1) (sometimes called just "polyolefin (Y-1) in the present invention) is excellent in the compatibility with the hydrogenated block copolymer of the present invention, and the transparency is not deteriorated when the polyolefin containing propylene as a main component (Y-1) is formed into a resin composition with propylene. Accordingly, a resin composition containing (Y-1) has an excellent balance in a transparency, optical property, flexibility, mechanical property, moldability, heat resistance, gas barrier property, low moisture absorbency and non-adsorptive property of chemical and also has excellent gas barrier property and water vapor impermeability especially as well as having excellent transparency, and thus can be used for a wide range of applications as a forming material for various containers, films and other produces.

In this regard, "containing propylene as a main component" means that propylene is contained with a ratio of more than 50% by mol based on the total monomer components as the raw materials.

<Polyolefin (Y-1)>

The polyolefin containing propylene as a main component (Y-1) is obtained by polymerizing or copolymerizing raw materials containing propylene as a main component as the monomer component, and a propylene homopolymer (polypropylene) or a copolymer of propylene and another olefin which mainly contains propylene is mentioned. When the polyolefin (Y-1) is a copolymer of propylene and another olefin, a kind or two or more kinds of α-olefins such as ethylene, 1-butene, 1-pentene, 1-hexene, 1-heptene, 1-methyl-1-pentene and styrene are mentioned as the other olefin and among them, a copolymer with ethylene and/or butene is particularly preferable because the balance in a heat resistance, impact resistance, transparency and the like is excellent. As the copolymer of propylene and the other olefin, propylene-ethylene copolymer, propylene-1-butene copolymer, propylene-ethylene-butene copolymer and the like are mentioned. In such a propylene copolymer, the compositional ratio (molar ratio) of propylene/other olefin is propylene/other olefin=50/50 or more and particularly preferably propylene/other olefin=96/4 to 70/30. When the ratio of propylene contained in the propylene copolymer is higher in the above range, the balance in a heat resistance and transparency tends to be excellent, while the impact resistance tends to be excellent when the ratio of propylene is lower in the above range.

<Content Ratios of Hydrogenated Block Copolymer (X) and Polyolefin (Y-1)>

Regarding the content ratios of the hydrogenated block copolymer (X) of the present invention and the polyolefin containing propylene as a main component (Y-1) in the resin composition of the present invention, the content ratio of the hydrogenated block copolymer (X) is preferably 10 to 90% by mass and the content ratio of (Y-1) is preferably 90 to 10% by mass. When the content ratio of the hydrogenated block copolymer (X) is the lower limit value above or more, the effect of the incorporation of the hydrogenated block copolymer (X) on the improvement of the balance in a flexibility and gas barrier property can be sufficiently achieved, which is preferable: while the heat resistance effect of the incorporation of the polyolefin (Y-1) can be sufficiently achieved when the content ratio of the hydrogenated block copolymer (X) is the upper limit value above or less, which is preferable. In view of further improving these effects, more preferably, the content ratio of the hydrogenated block copolymer (X) is 20 to 80% by mass and the content ratio of the polyolefin (Y-1) is 80 to 20% by mass, and particularly preferably, the content ratio of the hydrogenated block copolymer (X) is 30 to 70% by mass and the content ratio of the polyolefin (Y-1) is 70 to 30% by mass.

In this regard, the resin composition of the present invention may contain only a kind of the hydrogenated block copolymer (X) of the present invention, or two or more kinds of the hydrogenated block copolymer (X) in which the structural components and compositions of the block A and the block B above, the weight average molecular weights, the hydrogenation rates of the aromatic rings and the like are different. Similarly, regarding the polyolefin (Y-1), only a kind of the polyolefin containing propylene as a main component (Y-1) may be contained, or two or more kinds of the polyolefin containing propylene as a main component (Y-1) in which the copolymerization components, the copolymerization compositions and the like of propylene are different may be contained.

The resin composition of the present invention may contain other resin components, various additives or the like if necessary in addition to the hydrogenated block copolymer (X) of the present invention and the polyolefin containing propylene as a main component (Y-1). Furthermore, the contents of the other resin components, various additives or the like in the resin composition containing the hydrogenated block polymer (X) and the polyolefin (Y-1) are preferably 30% by mass or less and more preferably 15% by mass or less as the content in the resin composition in order to achieve the effects of the present invention, especially the transparency and the gas barrier property.

[Resin Composition of Hydrogenated Block Copolymer (X) and Amorphous Polyolefin (Y-2)]

Among polyolefin resins, an amorphous polyolefin (Y-2) is excellent in the compatibility with the hydrogenated block copolymer of the present invention, and the transparency is not deteriorated when a resin composition with propylene is formed and the original impact resistance of the amorphous polyolefin (Y-2) is not impaired when a resin composition with the amorphous polyolefin (Y-2) is formed. Furthermore, the hydrogenated block copolymer (X) and the amorphous polyolefin (Y-2) have similar refractive indexes and thus a resin composition excellent in the transparency can be obtained. Accordingly, it is possible to provide a resin composition which is flexible and excellent in the moldability and which is also excellent in the impact resistance, transparency and gas barrier property.

<Amorphous Polyolefin (Y-2)>

The amorphous polyolefin (Y-2) contained in the resin composition of the present invention is a polyolefin (Y-2) having amorphous property (that is, a property in which a melting point is not substantially observed by the DSC measurement) which is selected from a copolymer of ethylene and a cyclic olefin (y1) (sometimes called "copolymer (y1)" below) and a hydrogen additive of a ring-opened polymer of a cyclic olefin (y2) (sometimes called "hydrogenated ring-opened polymer (y2)" below). In this regard, the copolymer (y1) is not limited to a copolymer of ethylene and a cyclic olefin but may be a copolymer of ethylene, a cyclic olefin and an olefin other than ethylene.

The number average molecular weight or the limiting viscosity number of the amorphous polyolefin (Y-2) is not particularly limited, and a preferable value can be appropriately selected depending on the purpose and the like. It is generally preferable that the number average molecular weight is within the range of 10,000 to 500,000 or the limiting viscosity number measured in decalin at 135° C. is within the range of 0.01 to 20 dL/g. The number average molecular weight or the limiting viscosity number of the amorphous polyolefin (Y-2) of the upper limit value above or less is preferable in view of the moldability, while the lower limit value above or more is preferable in view of the toughness.

Preferable specific examples of the amorphous polyolefin (Y-2) are a polymer having the repeating unit represented by the formula (1) below and a polymer having the repeating unit represented by the formula (2) below, but the amorphous polyolefin (Y-2) used in the present invention is not limited to any of those described below.

<Copolymer (y1)>

Examples of the cyclic olefin as the copolymerization component of ethylene in the copolymer (y1) are norbornenes such as norbornene, bicyclo[2.2.1]-2-heptene, 5-methylbicyclo[2.2.1]-2-heptene, 5,6-dimethylbicyclo[2.2.1]-2-heptene, tetracyclo[4.4.0.1$^{2,5}$.1$^{7,10}$]-3-dodecene, 8-methyltetracyclo[4.4.0.1$^{2,5}$.1$^{7,10}$]-3-dodecene and 8,9-dimethyltetracyclo[4.4.0.1$^{2,5}$.1$^{7,10}$]-3-dodecene. Such a cyclic olefin may further have a substituent such as an alkyl group and a polar group including halogen, ester, nitrile, pyridyl and the like. A kind of these cyclic olefins may be used alone or two or more kinds thereof may be used in combination. Among them, norbornene and tetracyclo[4.4.0.1$^{2,5}$.1$^{7,10}$]-3-dodecene are preferable.

Furthermore, when the copolymer (y1) contains an olefin other than ethylene as a copolymerization component, for example, α-olefins having 3 to 20 carbon atoms such as propylene, 1-butene, 4-methyl-1-pentene, 1-hexene, 1-octene, 1-decene, 1-dodecene, 1-tetradecene, 1-hexadecene, 1-octadecene and 1-eicosen and the like are mentioned as the olefin. A kind of these olefins may be used alone or two or more kinds thereof may be used in combination.

Regarding the ratios of ethylene and the cyclic olefin as the monomer components contained in the copolymer (y1), the molar ratio of ethylene/cyclic olefin is preferably within the range of ethylene/cyclic olefin=80/20 to 30/70. When the ratio of ethylene is lower in this range, the glass transition temperature of the copolymer (y1) increases and the heat resistance tends to be excellent, while the moldability of the copolymer (y1) tends to be excellent and the toughness tends to be excellent when the ratio of ethylene is higher in this range.

Furthermore, when the copolymer (y1) contains the olefin other than ethylene as a monomer component, the ratio of the olefin other than ethylene is preferably 50% by mol or less and particularly preferably 30% by mol or less based on that of ethylene, in order to maintain the characteristics as the copolymer of ethylene and the cyclic olefin.

The production method for the copolymer (y1) is not particularly limited and various known production methods may be adopted. The copolymer (y1) can be produced, for example by copolymerizing ethylene and the cyclic olefin, or the olefin other than ethylene used if necessary with ethylene and the cyclic olefin in a liquid phase. The copolymerization in a liquid phase can be conducted in the presence of a catalyst consisting of a soluble vanadium compound and an organoaluminum compound in a hydrocarbon solvent such as cyclohexane at a temperature within the range of $-50°$ C. to $100°$ C. under a pressure within the range of 0 to 50 kg/cm$^2$.

As the copolymer (y1), for example, a polymer having the repeating unit represented by the formula (1) below is preferable.

[Chem. 1]

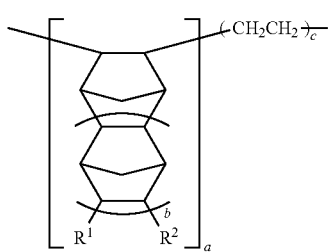

(1)

In the formula (1) above, R$^1$ and R$^2$ may be the same or different from each other and represent hydrogen atom, hydrocarbon residue or a polar group such as halogen, ester, nitrile or pyridyl. Further, R$^1$ and R$^2$ may be bonded to each other to form a ring. a is an integer of 1 or larger, b is an integer of 0 or larger and c is an integer of 1 or larger.

The copolymer (y1) is available as a commercially available product, and specific examples thereof are product name "APEL (registered trademark)" manufactured by Mitsui Chemicals, Inc., product name "TOPAS (registered trademark)" of Polyplastics Co., Ltd. and the like.

<Hydrogenated Ring-Opened Polymer (y2)>

Examples of the cyclic olefin constituting the hydrogenated ring-opened polymer (y2) are norbornenes such as bicyclo[2.2.1]-2-heptene, 5-methylbicyclo[2.2.1]-2-heptene, 5,6-dimethylbicyclo[2.2.1]-2-heptene, 5-carboxymethylbicyclo[2.2.1]-2-heptene, cyclopentadiene, dicyclopentadiene, 2,3-dihydrodicyclopentadiene, tetracyclo[4.4.0.1$^{2,5}$.1$^{7,10}$]-3-dodecene, 8-methyltetracyclo[4.4.0.1$^{2,5}$.1$^{7,10}$]-3-dodecene, 8-ethyltetracyclo[4.4.0.1$^{2,5}$.1$^{7,10}$]-3-dodecene, 8-carboxymethyltetracyclo[4.4.0.1$^{2,5}$.1$^{7,10}$]-3-dodecene and 8-methyl-8-carboxymethyltetracyclo[4.4.0.1$^{2,5}$.1$^{7,10}$]-3-dodecene.

These cyclic olefins may further have a substituent such as an alkyl group and a polar group including halogen, ester, nitrile, pyridyl and the like. A kind of these cyclic olefins may be used alone or two or more kinds thereof may be used in combination.

The production method of the hydrogenated ring-opened polymer (y2) is not particularly limited, either, and various known production methods can be adopted. The hydrogenated ring-opened polymer (y2) can be produced, for example by conducting ring-opening polymerization of the cyclic olefin and then hydrogenating the olefin unsaturated bonding moiety that the polymer produced has. The ring-opening polymerization of the cyclic olefin can be conducted, for example in a catalyst system containing a transition metal compound or a platinum metal compound and an organic metal compound such as organoaluminum compound in the presence of an additive such as aliphatic or aromatic tertiary amine if necessary at a temperature within the range of $-20°$ C. to $100°$ C. under a pressure within the range of 0 to 50 kg/cm$^2$G. Further, the hydrogenation can be conducted in the presence of a general hydrogenation catalyst.

As the hydrogenated ring-opened polymer (y2), for example, a polymer having the repeating unit represented by the formula (2) below is preferable.

[Chem. 2]

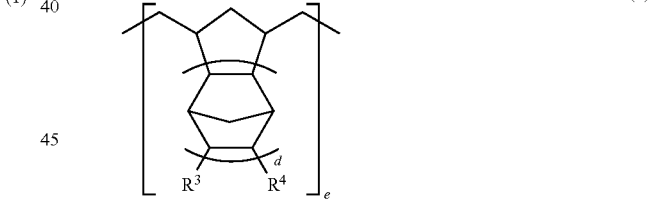

(2)

In the formula (2) above, R$^3$ and R$^4$ may be the same or different from each other and represent hydrogen atom, hydrocarbon residue or a polar group such as halogen, ester, nitrile or pyridyl. Further, R$^3$ and R$^4$ may be bonded to each other to form a ring. e is an integer of 1 or larger and d is 0 or an integer of 1 or larger. In this regard, the hydrogenated ring-opened polymer (y2) may contain several kinds having different structures among the structures represented by the formula (2) above. In addition, it is preferable that the unit represented by the formula (3) below among the unit represented by the formula (2) above is contained, and more specifically, it is preferable that 30% by mol or more of the unit represented by the formula (3) below is contained in the molecule.

[Chem. 3]

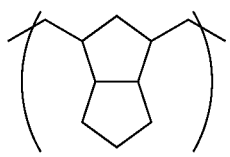

(3)

The hydrogenated ring-opened polymer (y2) is available as a commercially available product, and specific examples thereof are the hydrogenated polymer with product name "Zeonor (registered trademark)" manufactured by Zeon Corporation, product name "ARTON (registered trademark)" manufactured by JSR Corporation and the like.

[Content Ratios of Hydrogenated Block Copolymer (X) and Amorphous Polyolefin (Y-2)]

Regarding the content ratios of the hydrogenated block copolymer (X) of the present invention and the amorphous polyolefin (Y-2) in the resin composition of the present invention, the content ratio of the hydrogenated block copolymer (X) is preferably 5 to 90% by mass and the content ratio of the amorphous polyolefin (Y-2) is preferably 95 to 10% by mass. When the content ratio of (X) is the lower limit value above or more, the balance in a flexibility, transparency and gas barrier property due to the incorporation of the hydrogenated block copolymer (X) tends to be excellent, while the effect of the incorporation of the amorphous polyolefin (Y-2) on the improvement of the gas barrier property tends to be excellent when the content ratio of the hydrogenated block copolymer (X) is the upper limit value above or less. In view of further improving these effects, the content ratio of the hydrogenated block copolymer (X) is more preferably 5 to 80% by mass and the content ratio of the amorphous polyolefin (Y-2) is more preferably 95 to 20% by mass, and the content ratio of the hydrogenated block copolymer (X) is particularly preferably 10 to 60% by mass and the content ratio of the amorphous polyolefin (Y-2) is particularly preferably 90 to 40% by mass.

In this regard, the resin composition of the present invention may contain only a kind of the hydrogenated block copolymer (X) of the present invention, or two or more kinds of the hydrogenated block copolymer (X) in which the structural components and compositions of the block A and the block B above, the weight average molecular weights, the hydrogenation rates of the aromatic rings and the like are different. Similarly, regarding the amorphous polyolefin (Y-2), only a kind of the copolymer (y1) or the hydrogenated ring-opened polymer (y2) may be contained, or two or more kinds of the copolymer (y1) or two or more kinds of the hydrogenated ring-opened polymer (y2) in which the copolymerization components, the copolymerization compositions and the like are different may be contained. Further, a kind or two or more kinds of the copolymer (y1) and a kind or two or more kinds of the hydrogenated ring-opened polymer (y2) may be contained.

The resin composition of the present invention may contain other resin components, various additives or the like if necessary in addition to the hydrogenated block copolymer (X) of the present invention and the amorphous polyolefin (Y-2). Furthermore, the contents of the other resin components, various additives or the like are preferably 30% by mass or less and more preferably 15% by mass or less as the content in the resin composition in order to achieve the effects of the present invention, especially the transparency and the water vapor permeability (gas barrier property).

[Resin Composition of Hydrogenated Block Copolymer (X) and Hydrogenated Vinyl Aromatic Block Copolymer (Y-3)]

Among the hydrogenated vinyl aromatic block copolymer (Y-3), by using a hydrogenated vinyl aromatic polymer (y3) and/or a hydrogenated block copolymer (y4) having a hydrogenated vinyl aromatic polymer block a and a block b of a polymer mainly containing a hydrogenated conjugate diene (sometimes merely called "hydrogenated block copolymer (y4)" below), the flexibility, transparency, gas barrier property and water vapor impermeability are excellent as well as the transparency is excellent, and thus the material can be used for a wide range of applications as a forming material for various containers, films and other produces.

[Hydrogenated Vinyl Aromatic Block Copolymer (Y-3)]

Among the hydrogenated vinyl aromatic block copolymer (Y-3) contained in the resin composition of the present invention, the hydrogenated vinyl aromatic polymer (y3) is obtained by hydrogenating a vinyl aromatic polymer, and the hydrogenated block copolymer (y4) is obtained by hydrogenating a block copolymer having a vinyl aromatic polymer block and a block of a polymer mainly containing a conjugate diene.

In this regard, "the block of a polymer mainly containing a conjugate diene" means that the conjugate diene is contained with a ratio of more than 50% by mass based on the total weight of the block of the polymer.

As the vinyl aromatic polymer of the hydrogenated vinyl aromatic polymer (y3) before hydrogenation, and the vinyl aromatic compound as the monomer component of the vinyl aromatic polymer block of the hydrogenated block copolymer (y4) before hydrogenation, any kind may be used as long as it is a compound having an aromatic ring and having a polymerizable vinyl group. A representative example of the vinyl aromatic compound is the compound represented by the formula (4) below.

[Chem. 4]

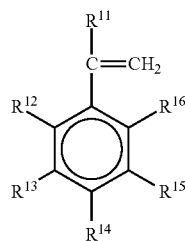

(4)

(In the formula (4) above, $R^{11}$ represents hydrogen atom or an alkyl group and $R^{12}$ to $R^{16}$ each independently represent hydrogen atom, an alkyl group or halogen atom.)

The alkyl group of $R^H$ in the formula (4) is preferably hydrogen atom or a lower alkyl group having 1 to 5 carbon atoms, and the lower alkyl group is specifically methyl group, ethyl group, propyl group, isopropyl group, butyl group, isobutyl group, sec-butyl group, tert-butyl group, amyl group or the like. $R^{12}$ to $R^{16}$ are preferably hydrogen atom or an alkyl group and more preferably hydrogen atom or a lower alkyl group which is similar to that of $R^{11}$. As the halogen atom of $R^{12}$ to $R^{16}$, for example, fluorine atom, chlorine atom, bromine atom and iodine atom are mentioned.

Specific examples of the vinyl aromatic compound are styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene and the like.

Among them, styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene and the like are preferable; styrene, α-methylstyrene, α-ethylstyrene, α-propylstyrene, α-isopropylstyrene, α-t-butylstyrene, 2-methylstyrene, 3-methylstyrene, 4-methylstyrene and 4-t-butylstyrene are particularly preferable; and styrene is especially preferable. In this regard, the segment of styrene is cyclohexylethyl segment in the hydride.

A kind of these vinyl aromatic compounds may be used alone or two or more kinds thereof may be used in combination.

On the other hand, as the conjugate diene as the monomer component of the polymer block mainly containing a conjugate diene of the hydrogenated block copolymer (y4) before hydrogenation, for example, conjugate dienes having 4 or 5 carbon atoms such as 1,3-butadiene, isoprene, 2,3-dimethyl-1,3-butadiene, 1,3-pentadiene and 1,3-hexadiene are mentioned, and 1,3-butadiene is preferable. For the polymerization of 1,3-butadiene, there are 1,4-bonding mode and 1,2-bonding mode, and 1,4-bonding mode leads to tetramethylene chain in the hydride and 1,2-bonding mode leads to butylene chain.

A kind of these conjugate dienes may be used alone or two or more kinds thereof may be used in combination.

In this regard, the hydrogenated vinyl aromatic polymer (y3) and the hydrogenated vinyl aromatic polymer block a of the hydrogenated block copolymer (y4) are generally composed of a hydrogenated vinyl aromatic compound only as a monomer, but may contain a monomer component other than a vinyl aromatic compound with a ratio of 50% by mass or less based on the total weight of the hydrogenated vinyl aromatic polymer or the hydrogenated vinyl aromatic polymer block a for example, as long as the aim of the present invention is not impaired.

In addition, the polymer block b mainly containing a hydrogenated conjugate diene in the hydrogenated block copolymer (y4) contains the hydrogenated conjugate diene as the monomer component with a ratio of more than 50% by mass, preferably 55% by mass or more, more preferably 60% by mass or more, further preferably 70% by mass or more and particularly preferably 80 to 100% by mass based on the total weight of the block b of the polymer mainly containing a hydrogenated conjugate diene, and another monomer may be copolymerized within the above range. By containing the hydrogenated conjugate diene as the monomer component in the block b of the polymer mainly containing a hydrogenated conjugate diene within the above range, the hydrogenated block copolymer (y4) excellent in the balance in a transparency and toughness can be obtained. When the block b of the polymer mainly containing a hydrogenated conjugate diene contains a monomer component other than the conjugate diene, the other monomer is not particularly limited as long as it is a monomer with which anion polymerization with the conjugate diene is possible, and examples thereof are a kind or two or more kinds of the above vinyl aromatic compounds, aliphatic olefins, dienes, vinyl ethers, β-pinenes and the like.

The hydrogenated block copolymer (y4) preferably has two or more of segment a (hydrogenated vinyl aromatic polymer block a) and one or more of segment b (block b of the polymer mainly containing a hydrogenated conjugate diene), and those having a structure such as a-(b-a)$_n$, (a-b)$_m$ and b-a-(b-a)$_n$-b (here, n represents an integer of 1 or larger and m represents an integer of 2 or larger) are mentioned depending on the combination. A copolymer having a-(b-a)$_n$, a triblock structure of a-b-a in particular, or a pentablock structure of a-b-a-b-a is preferable among them.

In this regard, however, the hydrogenated block copolymer (y4) may be a copolymer having one segment a (hydrogenated vinyl aromatic polymer block a) and one segment b (block b of the polymer mainly containing a hydrogenated conjugate diene), namely a-b.

The content of the block b of the polymer mainly containing a hydrogenated conjugate diene of the hydrogenated block copolymer (y4) is preferably 5% by mass or more, more preferably 10% by mass or more and further preferably 20% by mass or more; while the content is preferably 80% by mass or less, more preferably 70% by mass or less, further preferably 60% by mass or less and particularly preferably 50% by mass or less. When the content of the block b of the polymer mainly containing a hydrogenated conjugate diene of the hydrogenated block copolymer (y4) is the upper limit value above or lower, the transparency tends to be excellent, while the toughness tends to be excellent when the content is the lower limit value above or more. That is, the hydrogenated vinyl aromatic block copolymer (Y-3) preferably has the block b of the polymer mainly containing a hydrogenated conjugate diene, and thus it is preferable to use the hydrogenated block copolymer (y4) as the hydrogenated vinyl aromatic block copolymer (Y-3) in the present invention.

In this regard, the hydrogenated block copolymer (y4) is appropriate when it has the hydrogenated vinyl aromatic polymer block a and the block b of the polymer mainly containing a hydrogenated conjugate diene, and may have a polymer or copolymer block c other than the hydrogenated vinyl aromatic polymer block a and the block b of the polymer mainly containing a hydrogenated conjugate diene. In this case, examples of the other block c are a polymer or copolymer block in which the content of the hydrogenated conjugate diene is less than 50% by mass in the block b of the polymer mainly containing a hydrogenated conjugate diene, and a polymer or copolymer block comprising a kind or two or more kinds of aliphatic olefins, dienes, vinyl ethers and β-pinenes.

In this regard, however, when the content of the other block c in the hydrogenated block copolymer (y4) is too high, the effect of the hydrogenated block copolymer (y4) by containing the hydrogenated vinyl aromatic polymer block a and the block b of the polymer mainly containing a hydrogenated conjugate diene is impaired. Thus, when the hydrogenated block copolymer (y4) contains the other block c, the content thereof is preferably 40% by mass or less and particularly preferably 20% by mass or less based on the total weight of the hydrogenated block copolymer (y4).

In this regard, the molecular structures of the hydrogenated vinyl aromatic polymer (y3) and the hydrogenated block copolymer (y4) may be linear, branched or radial or an arbitrary combination thereof.

As the production methods for the hydrogenated vinyl aromatic polymer (y3) and the hydrogenated block copolymer (y4) of the hydrogenated vinyl aromatic block copolymer (Y-3) used in the present invention, any production method may be used as long as the above structures can be obtained, and the hydrogenated vinyl aromatic polymer (y3) and the hydrogenated block copolymer (y4) are generally produced by producing a vinyl aromatic polymer or a block copolymer having a vinyl aromatic polymer block and a polymer block mainly containing a conjugate diene before hydrogenation and hydrogenating the polymer or the copolymer.

As the initiator used for the polymerization or copolymerization (which is described "(co)polymerization", and "the polymer or the block copolymer" is described "the (co)polymer" below) of the polymer or the block copolymer before hydrogenation above, an initiator comprising an organic alkali metal, an initiator comprising a combination of an organic alkali metal and a Lewis base, and the like are mentioned, and an initiator comprising a combination of an organic alkali metal and a Lewis base is preferable in order to narrow the molecular weight distribution.

Examples of the organic alkali metal are monoorganolithium compounds such as n-butyllithium, sec-butyllithium, t-butyllithium, hexyllithium, phenyllithium and stilbenelithium; multifunctional organolithium compounds such as dilithiomethane, 1,4-dilithiobutane, 1,4-dilithio-2-ethylcyclohexane and 1,3,5-trilithiobenzene; sodium naphthalene, potassium naphthalene and the like. Among them, organolithium compounds are preferable and monoorganolithium compounds are particularly preferable.

A kind of these organic alkali metals may be used alone or two or more kinds thereof may be used in combination. The amount of the organic alkali metal used is appropriately determined depending on the molecular weight of the produced (co)polymer required, and is within the range of generally 0.05 to 100 mmol, preferably 0.10 to 50 mmol and more preferably 0.15 to 20 mmol per 100 parts by mass of the monomer.

The Lewis base is useful for obtaining a (co)polymer having a narrow molecular weight distribution. The Lewis base is not particularly limited as long as it is generally used for solution polymerization: and examples thereof are ether compounds; tertiary amine compounds such as tetramethylethylene diamine, trimethyl amine, triethyl amine and pyridine; alkali metal alkoxide compounds such as potassium-t-amyloxide and potassium-t-butyloxide; phosphine compounds such as triphenyl phosphine and the like. Among them, an ether compound is especially preferable because the molecular weight distribution (Mw/Mn) of the (co)polymer obtained can be sufficiently narrowed.

The ether compound is not particularly limited, and ether compounds having generally 2 to 100 carbon atoms, preferably 4 to 50 carbon atoms and more preferably 4 to 20 carbon atoms are preferably used. Specific examples thereof are aliphatic monoethers such as dimethyl ether, diethyl ether, diisopropyl ether, dibutyl ether, diamyl ether, diisoamyl ether, methylethyl ether, methylpropyl ether, methylisopropyl ether, methylbutyl ether, methylisoamyl ether, ethylpropyl ether, ethylisopropyl ether and ethylbutyl ether; aromatic monoethers such as anisole, phenetol, diphenyl ether and dibenzyl ether; cyclic monoethers such as tetrahydrofuran and tetrahydropyran; alkylene glycol dialkyl ethers such as ethylene glycol dimethyl ether, ethylene glycol methylethyl ether, ethylene glycol diethyl ether, ethylene glycol dipropyl ether, ethylene glycol dibutyl ether, ethylene glycol diamyl ether, ethylene glycol dioctyl ether, propylene glycol dimethyl ether, propylene glycol diethyl ether, propylene glycol dibutyl ether, isopropylene glycol dimethyl ether, isopropylene glycol diethyl ether, butylene glycol dimethyl ether, butylene glycol diethyl ether and butylene glycol dibutyl glycol; alkylene glycol alkylaryl ethers such as ethylene glycol methylphenyl ether; alkylene glycol diaryl ethers such as ethylene glycol diphenyl ether; alkylene glycol diaralkyl ethers such as ethylene glycol dibenzyl ether and the like.

A kind of these Lewis bases may be used alone or two or more kinds thereof may be used in combination. The amount of the Lewis base used is within the range of generally 0.001 to 10.0 mmol, preferably 0.01 to 5.0 mmol and more preferably 0.1 to 2.0 mmol based on 1 mol of the organic alkali metal used as the initiator.

As the hydrocarbon solvent used in the (co)polymerization reaction is not specifically limited as long as the solvent can dissolve the (co)polymer produced and does not deactivate the initiator, and examples thereof are aliphatic hydrocarbons such as n-butane, n-pentane, iso-pentane, n-hexane, n-heptane and iso-octane; alicyclic hydrocarbons such as cyclopentane, cyclohexane, methylcyclopentane, methlcyclohexane and decalin; aromatic hydrocarbons such as benzene and toluene and the like. Among them, when an aliphatic hydrocarbon or an alicyclic hydrocarbon is used, the hydrogenation reaction can be directly conducted, which is preferable. A kind of these hydrocarbon solvents may be used alone or two or more kinds thereof may be used in combination generally with a content ratio with which the monomer concentration of the raw materials is 1 to 30% by mass.

The (co)polymerization reaction may be an isothermal reaction or an adiabatic reaction and is conducted with the polymerization temperature range of generally 0 to 150° C. and preferably 20 to 120° C. The reaction time is within the range of generally 0.01 to 20 hours and preferably 0.1 to 10 hours.

After the reaction, the (co)polymer can be recovered by a known method such as steam stripping method, direct solvent-removal method and alcohol coagulation method. Further, when a solvent inert to the hydrogenation reaction is used during the reaction, the reaction solution can be directly subjected to the hydrogenation process without recovering the (co)polymer from the reaction solution.

The hydrogenation method of the vinyl aromatic (co)polymer thus obtained is not specifically limited as long as it is a hydrogenation method having a high hydrogenation rate of the aromatic ring and with less (co)polymer-chain cleavage. An example thereof is a method conducted in an organic solvent using a hydrogenation catalyst containing at least a metal selected from nickel, cobalt, iron, titanium, rhodium, palladium, platinum, ruthenium and rhenium. Among the hydrogenation catalysts above, nickel catalyst is especially preferable because a hydrogen additive with small Mw/Mn can be obtained. The hydrogenation catalyst may be a heterogeneous catalyst or a homogeneous catalyst.

The heterogeneous catalyst can be used in the form of a metal or a metal compound or by supporting on an appropriate carrier. As the carrier, for example, activated carbon, silica, alumina, calcium carbonate, titania, magnesia, zirconia, diatom earth, silicon carbide and the like are mentioned. When diatom earth among them is used, the molecular weight distribution can be further narrowed, which is preferable. The supporting amount of the metal above on the carrier in this case is generally within the range of 0.01 to 80% by mass and preferably within the range of 0.05 to 60% by mass.

As the homogeneous catalyst, catalysts in which a compound of nickel, cobalt, titanium or iron and an organic metal compound such as an organoaluminum compound or an organolithium compound are combined; organic metal complexes such as rhodium, palladium, platinum, ruthenium and rhenium and the like can be used. As the compound of nickel, cobalt, titanium or iron used for the homogeneous catalyst, for example, acetyl acetone salt, naphthenate, cyclopentadienyl compound, cyclopentadienyl dichloro compound and the like of each metal are mentioned. As the organoaluminum compound, alkylaluminum such as triethylaluminum and tri-isobutylaluminum; halogenated alkylaluminum such as diethylaluminum chloride and ethylaluminum dichloride; hydrogenated alkylaluminum such as diisobutylaluminum halide; and the like are mentioned. Examples of the organic metal complex are γ-dichloro-π-benzene complex, dichlorotris(triphenylphosphine) complex, hydride-chloro-tris(triphenylphosphine) complex and the like of each metal above.

A kind of these hydrogenation catalysts may be used alone or two or more kinds thereof may be used in combination.

The amount of the hydrogenation catalyst used is within the range of generally 0.03 to 50 parts by mass, preferably 0.16 to 33 parts by mass and more preferably 0.33 to 15 parts by mass per 100 parts by mass of the (co)polymer subjected to the hydrogenation.

As the organic solvent used for the hydrogenation method, for example, the aliphatic hydrocarbons above; the alicyclic hydrocarbons above; ethers such as tetrahydrofuran and dioxane; alcohols; esters and the like are mentioned. A kind of these organic solvents may be used alone or two or more kinds thereof may be used in combination. The organic solvent is used in such a way that the concentration of the (co)polymer subjected to the hydrogenation is within the range of generally 1 to 50% by mass, preferably 3 to 40% by mass and more preferably 5 to 30% by mass.

The hydrogenation reaction is conducted at a temperature within the range of generally 10 to 250° C., preferably 50 to 200° C. and more preferably 80 to 180° C., under a hydrogen pressure within the range of generally 1 to 300 kg/cm$^2$, preferably 10 to 250 kg/cm$^2$ and more preferably 20 to 200 kg/cm$^2$.

The hydrogenation rate of the aromatic rings of the hydrogenated vinyl aromatic polymer (y3) and the hydrogenated block copolymer (y4) of the hydrogenated vinyl aromatic block copolymer (Y-3) is preferably 50% by mol or more, more preferably 80% by mol or more and further preferably 90% by mol or more. When the hydrogenation rate is the lower limit value above or more, the heat resistance tends to be excellent. The hydrogenation rate of the aromatic ring can be calculated, for example by $^1$H-NMR from the integral value of the peak derived from the aliphatic component around 0.5 to 2.5 ppm and the peak derived from the aromatic ring around 6.0 to 8.0 ppm.

The method for recovering the hydrogenated vinyl aromatic polymer (y3) or the hydrogenated block copolymer (y4) after the completion of the hydrogenation reaction above is not particularly limited. As the recovery method, known methods such as steam coagulation method for removing the hydrogenation catalyst residue generally by a method such as filtration and centrifugal separation and then removing the solvent by steam stripping from the solution in which the hydrogenated vinyl aromatic polymer (y3) or the hydrogenated block copolymer (y4) is dissolved, direct solvent-removal method for removing the solvent under reduced pressure under heating, coagulation method for precipitating and coagulating the hydrogenated vinyl aromatic polymer (y3) or the hydrogenated block copolymer (y4) by pouring a solution to a poor solvent of the hydrogenated vinyl aromatic polymer (y3) or the hydrogenated block copolymer (y4) such as methanol, ethanol, isopropyl alcohol, water, acetone, methylethyl ketone and ethyl acetate can be adopted.

The polystyrene-conversion weight average molecular weight (Mw) of the hydrogenated vinyl aromatic polymer (y3) or the hydrogenated block copolymer (y4), which is measured by gel permeation chromatography (GPC) using tetrahydrofuran as the solvent, is generally 50,000 or more, preferably 60,000 or more and more preferably 70,000 or more, and generally 500,000 or less, 300,000 or less and more preferably 200,000 or less. When the Mw of the hydrogenated vinyl aromatic polymer (y3) or the hydrogenated block copolymer (y4) is the lower limit value above or more, the toughness of the compact obtained is excellent, while the melt viscosity during processing decreases and the moldability is excellent when the Mw is the upper limit value above or less.

The molecular weight distribution of the hydrogenated vinyl aromatic polymer (y3) or the hydrogenated block copolymer (y4) can be appropriately determined depending on the intended use, and the ratio of the polystyrene-conversion Mw measured by GPC above and the number average molecular weight (Mn) (Mw/Mn) of the hydrogenated vinyl aromatic polymer (y3) is preferably 10 or less, more preferably 7 or less and particularly preferably 5 or less. When the Mw/Mn is the upper limit value above or less, a compact excellent in the balance in a moldability and toughness and the like tends to be easily obtained. On the other hand, the molecular weight distribution of the hydrogenated block copolymer (y4) is preferably 4 or less, more preferably 3 or less and particularly preferably 2 or less. When the Mw/Mn is the upper limit value above or less, a compact excellent in the balance in a moldability and toughness and the like tends to be easily obtained.

The lower limit of the melt flow rate (MFR) at 240° C. and 49 N (nozzle diameter 2 mm) of the hydrogenated vinyl aromatic polymer (y3) is generally 1.0 g/minute or more, preferably 2.0 g/minute or more, more preferably 3.0 g/minute or more and most preferably 5.0 g/minute or more. The upper limit of the MFR is generally 100 g/minute or less, preferably 50 g/minute or less, more preferably 30 g/minute or less and most preferably 20 g/minute or less. When the MFR is the lower limit value above or more, the production with a viscosity which is appropriate for molding and production is easy, while the moldability during processing is excellent and the mechanical property of a product is sufficient when the MFR is the upper limit value above or less. The lower limit of the melt flow rate (MFR) at 240° C. and 49 N (nozzle diameter 2 mm) of the hydrogenated block copolymer (y4) is generally 0.1 g/minute or more, preferably 0.5 g/minute or more, more preferably 1.0 g/minute or more and most preferably 2.0 g/minute or more. The upper limit of the MFR is generally 200 g/minute or less, preferably 100 g/minute or less, more preferably 50 g/minute or less and most preferably 30 g/minute or less. When the MFR is the lower limit value above or more, the production with a viscosity which is appropriate for molding and production is easy, while the moldability during processing is excellent and the mechanical property of a product tends to be sufficient when the MFR is the upper limit value above or less.

[Content Ratios of Hydrogenated Block Copolymer (X) and Hydrogenated Vinyl Aromatic Block Copolymer (Y-3)]

Regarding the content ratios of the hydrogenated block copolymer (X) of the present invention and the hydrogenated vinyl aromatic polymer (y3) and/or the hydrogenated block copolymer (y4) of the hydrogenated vinyl aromatic block copolymer (Y-3) in the resin composition of the present invention, it is preferable that the content ratio of the hydrogenated block copolymer (X) is 5 to 95% by mass and the content ratio of the hydrogenated vinyl aromatic polymer (y3) and/or the hydrogenated block copolymer (y4) of the hydrogenated vinyl aromatic block copolymer (Y-3) is 95 to 5% by mass. When the content ratio of the hydrogenated block copolymer (X) is the lower limit value above or more, the effect of the incorporation of the hydrogenated block copolymer (X) on the improvement of the flexibility, toughness, gas barrier property and the like can be sufficiently achieved, which is preferable: while the heat resistance effect of the incorporation of the hydrogenated vinyl aromatic block copolymer (Y-3) is sufficiently achieved when the content ratio of the hydrogenated block copolymer (X) is the upper limit value above or less, which is preferable. In view of further improving these effects, the more preferable content ratio of the hydrogenated block copolymer (X) is 10 to 90% by mass and the more preferable content ratio of the hydrogenated vinyl aromatic block copolymer (Y-3) is 90 to 10% by mass, and the particularly preferable content ratio of the hydrogenated block copolymer (X) is 20 to 80% by mass and the particularly preferable content ratio of the hydrogenated vinyl aromatic block copolymer (Y-3) is 80 to 20% by mass.

In this regard, the resin composition of the present invention may contain only one kind of the hydrogenated block copolymer (X), or two or more kinds of the hydrogenated block copolymer (X) in which the structural components and compositions of the block A and the block B above, the weight average molecular weights, the hydrogenation rates of the aromatic rings and the like are different. Similarly, regarding the hydrogenated vinyl aromatic block copolymer (Y-3), only one kind of the hydrogenated vinyl aromatic polymer (y3) or the hydrogenated block copolymer (y4) may be contained, two or more kinds of the hydrogenated vinyl aromatic polymer (y3) or two or more kinds of the hydrogenated block copolymer (y4) may be contained, or a kind or two or more kinds of the hydrogenated vinyl aromatic polymer (y3) and a kind or two or more kinds of the hydrogenated block copolymer (y4) may be contained.

The resin composition of the present invention may contain other resin components, various additives or the like if necessary in addition to the hydrogenated block copolymer (X) of the present invention and the hydrogenated vinyl aromatic block copolymer (Y-3). Furthermore, the contents of the other resin components, various additives or the like are preferably 30% by mass or less and more preferably 15% by mass or less as the content in the resin composition in order to achieve the effects of the present invention, especially the transparency and the gas barrier property.

[Additive of Resin Composition]

As the additive that the resin composition of the present invention may contain, antioxidant, heat-stabilizing agent, photo-stabilizing agent, ultraviolet absorbing agent, bulking agent such as filler, neutralizing agent, lubricant, antifog agent, antiblocking agent, slip agent, dispersing agent, coloring agent, flame retardant, antistatic agent, conductivity-imparting agent, cross-linking agent, cross-linking auxiliary agent, metal deactivator, molecular-weight controller, antibacterial agent, mildew-proofing agent, fluorescent brightener, light-diffusing agent such as organic diffusing agent and inorganic diffusing agent and the like are mentioned.

[Production Method for Resin Composition]

The resin composition of the present invention can be produced, for example by a method for mechanically melt-kneading each component above. As the melt-kneader that can be used here, for example, uniaxial extruder, biaxial extruder, Brabender kneader, Banbury mixer, kneader blender, roll mil and the like can be mentioned. The lower limit of the kneading temperature is generally 100° C., preferably 145° C. and more preferably 160° C. The upper limit of the kneading temperature is generally 350° C., preferably 300° C. and more preferably 250° C. Regarding the kneading, all components may be kneaded at the same time or a multi-stage-separated kneading method for kneading any components and then adding and kneading the remaining components may be used.

[Method for Molding Resin Composition]

The resin composition of the present invention can be processed to obtain various compacts by molding methods such as injection molding (insert molding method, two-color molding method, sandwich molding method, gas injection molding method and the like), extrusion molding method, inflation molding method, T-die film molding method, laminate molding method, blow molding method, hollow molding method, compacting molding method, calendar molding method and the like. The form of the compact is not particularly limited, a sheet, a film, a plate, particles, an aggregated body, fibers, a stick, a porous body, foam and the like are mentioned, and a sheet, a film and a plate are preferable. Further, a formed film can be uniaxially or biaxially stretched. As the stretching method, roll method, tenter method, tubular method and the like are mentioned. Furthermore, surface treatment such as corona discharge treatment, flame treatment, plasma treatment and ozone treatment which are industrially generally used may be conducted.

[Applications]

The application of the compact of the present invention is not particularly limited and the following applications can be mentioned as examples. That is, the applications are coating materials for electric cables, codes and wire harnesses, insulation sheets, displays and touch panels for OA (Office Automatic) devices, membrane switches, photograph covers, relay parts, coil bobbins, IC sockets, fuse cases, camera pressure plates, FDD collets and floppy hubs in the field of electric and electronic appliances; optical disk substrates, pick-up lenses for optical disks, optical lenses, LCD substrates, PDP substrates, television screens for projection televisions, phase difference films, fog lamp lenses, lighting switch lenses, sensor switch lenses, Fresnel lenses, protective glasses, projection lenses, camera lenses, sunglasses, light guide plates, reflectors for camera flash lamps and LED reflectors in the field of optical components; headlight lenses, direction indicator light lenses, taillight lenses, resin window glass, indicator covers, outer panels, door handles, rear panels, wheel covers, visors, roof rails, sunroofs, instrument panels, panels, coating materials for control cables, air-bag covers, mud guards, bumpers, boots, air hose, lamp packing, gaskets, various types of molding such as window molding, site shields, weather strips, glass run channels, grommets and vibration-absorbent and sound-absorbent parts in automobile parts; joint sealers, handrails, windows, table edge materials, sashes, bathtubs, window frames, signs, lighting covers, water tanks, wainscot for stairs, carports, sound insulation walls for freeways, multiwall sheets, coating materials for steel cables, panel light globes, switch breakers, protection covers for machine tools, industrial deep drawing vacuum-molded containers and pump housing in the architectural material field; various types of packing, grips, belts, foot rubbers, rollers, protectors, suckers, gaskets for refrigerators, switches, connector covers, game machine covers, Japanese pinball machines, OA housing, notebook computer housing, trays for HDD heads, windows for instruments, transparent housing, rollers with gears for OA, switch case sliders, gas cock knobs, clock frames, gear train parts for watches, umber caps, various rolls for OA devices, tubular compacts such as hoses and tubes, atypical extruded products, leather-like products, meshing tools, toys such as dolls with a soft texture, pen grips, straps, suckers, clocks, umbrella bones, cosmetics cases, general sundry goods such as toothbrush handles, housewares, containers such as Tupperware, banding bands, and bottles such as blow-molded infusion bottles, food bottles, water bottles and bottles for personal care such as cosmetics in the field of home electronics and light electric applications; catheters, syringes, syringe gaskets, infusion cylinders, tubes, ports, caps, rubber stoppers, dialyzers, blood connectors, artificial teeth and disposal containers in the medical parts; and the like, and applications by foam molding can be also adopted.

The application of the compact of the present invention in the film-sheet field is not particularly limited and the following applications can be mentioned as examples. That is, the applications are in the field of food or sundry good wrapping such as stretch films for wrapping, industrial or household wrapping films, pallet stretch films, stretch labels, shrink films, shrink labels, films for sealants, films for retorts, sealant films for retorts, aroma-retention heat-sealing films, sealants for A-PET, containers and lids for deep-frozen foods, cap seals, hot-melt films, hot-adhesive films, hot-seal films, bag-in-box sealant films, retort pouches, standing pouches, spout pouches, laminate tubes, heavy-duty sack, fiber-wrapping films; in the field of agricultural films such as films for houses and multi-films; in the field of medical films and sheets such as infusion bags, multi-room containers for high-calorie infusion, continuous ambulatory peritoneal dialysis (CAPD) or the like, discharge bags for peritoneal dialysis, blood bags, urine bags, operation bags, ice pillows, ampule cases and PTP wrapping; in the architectural material-related field such as civil engineering impermeable sheets, water stop materials, mats, joint sealers, floor materials, roofing materials, decorative films, skin films and wallpapers; in the field of automobile parts such as leathers, ceiling materials, trunk room liners, interior skin materials, vibration-absorbent sheets and sound-absorbent sheets; in the field of light electric applications such as display covers, battery cases, mouse pads, mobile phone cases, IC card cases, floppy disk cases and CD-ROM cases; in the toiletry or sanitary field such as toothbrush cases, puff cases, cosmetic cases, eyewash and other medicine cases, tissue cases and face packs; in the office supply-related field such as stationery films and sheets, clear plastic folders, pen cases, pocketbook covers, desk mats, key board covers, book covers and binders; in the field of general household and sundry goods such as leathers for furniture, toys such as beach balls, rainwear such as umbrellas and raincoats, tablecloths, blister packages, bathtub covers, towel cases, fancy cases, tag cases, pouches, charm bags, insurance certificate covers, bankbook covers, passport cases and cutlery cases; retroreflector sheets, synthetic papers and the like. Further, as the adhesive composition or in the field of films and sheets which are adhesive because an adhesive material is coated on a substrate, carrier tapes, adhesive tapes, marking films, semiconductor or glass dicing films, surface-protective films, protective films for steel and plywood, car-protective films, wrapping and banding adhesive tapes, adhesive tapes for office or household use, bonding adhesive tapes, paint-masking adhesive tapes, surface-protective adhesive tapes, sealing adhesive tapes, anticorrosive and waterproof adhesive tapes, electric insulating adhesive tapes, adhesive tapes for electronic devices, adhesive tapes for medical and sanitary materials such as plaster films and substrate films for adhesive plasters, adhesive tapes for identification and decoration, tapes for display, wrapping tapes, surgical tapes, adhesive tapes for labels and the like are mentioned.

The application of the compact of the present invention in the fiber and non-woven fabric field is not particularly limited and the following applications can be mentioned as examples. That is, by forming fibers such as continuous spun yarn, continuous crimped yarn, short fibers and monofilaments or flat yarn, or forming non-woven fabric by melt blow method or spunbond method, disposal diapers or other sanitary applications, medical applications such as operation gowns and gloves, inner gloves, carpets and back clothes thereof, ropes and other applications are mentioned. Further, canvases, tent materials, tops, flexible containers, picnic sheets, tarpaulins and the like, which are obtained by laminating the non-woven fabric or fabric of monofilament, flat yarn, slit tape or the like and a film or a sheet, are mentioned.

[Film]

The resin composition of the present invention is especially useful as a forming material for a film among various applications described above due to its excellent mechanical strength, transparency and gas barrier property.

The film of the present invention obtained by forming the resin composition of the present invention may be a single layer film comprising the resin composition of the present invention or a laminate film having two or more layers in which the resin composition of the present invention is formed by co-extrusion with other resin compositions.

Such a film is useful as an original fabric film for processing and forming into the containers described below, a protective film for a display of an electronic device, a mobile phone or a smartphone or the like, and the film does not impair the visibility of the display under the film because of the excellent transparency and has excellent protective effect on a device due to the excellent mechanical strength and gas barrier property.

[Container]

The resin composition of the present invention is especially useful as a forming material for a container among various applications described above, due to its excellent mechanical strength, transparency and gas barrier property. Further, because of the excellent transparency, the content can be easily confirmed. Furthermore, because of the excellent gas barrier property and mechanical strength, the resin composition can prevent the degradation or the compositional change of the content due to the external stress, a permeated substance from air or scattering of the content and can preserve the content stably. In particular, the resin composition of the present invention is most preferable as wetted materials of medicine containers such as pre-filled syringes, ampules and infusion bags, and the inner layer materials or intermediate layer materials thereof when the wetted materials are laminates constituted by many layers.

EXAMPLES

The present invention is explained further in detail below using Examples, but the present invention is not limited by the following Examples as long as the gist thereof is not exceeded.

The measurement of each physical property was conducted in accordance with the following methods.

(1) Molecular Weight:

Regarding the measurements of the weight average molecular weight (Mw) and the number average molecular weight (Mn) of the hydrogenated block copolymer or the block copolymer, the values were calculated as the standard polystyrene conversion with the following conditions using gel permeation chromatography (GPC).

Device: Waters 2690 manufactured by Nihon Waters K.K.
Detector (RI detection): Waters 2410 manufactured by Nihon Waters K.K.
Column: Shodex manufactured by Showa Denko K.K.
A KF-604 column, a KF-603 column and a KF-602.50 column were connected in series and used.
Solvent: Tetrahydrofuran
Flow rate: 0.7 mL/min
Temperature: 40° C.

(2) Hydrogenation Rate:

The hydrogenation rate (% by mol) of the aromatic ring of the hydrogenated block copolymer was calculated after measuring $^1$H-NMR spectrum.

(3) Total Haze (Injection Moldability):

Using a sample piece obtained by injection molding the hydrogenated block copolymer or the block copolymer, the total haze was measured in accordance with JIS K7105 and the surface smoothness in injection molding was evaluated.

(4) Internal Haze (Transparency):

Oil was coated on a sample piece obtained by injection molding the hydrogenated block copolymer or the block copolymer to eliminate the influence of the surface asperity, the internal haze was measured in accordance with JIS K7105 and the transparency was evaluated.

(5) A Hardness:

Using a sample piece obtained by injection molding the hydrogenated block copolymer or the block copolymer, the durometer hardness A was measured in accordance with JIS K6253.

(6) MFR:

The MFR of the hydrogenated block copolymer or the block copolymer was measured in accordance with JIS K7210 under the condition of 230° C. and a load of 21.2 N.

(7) Gas Barrier Property (Water Vapor Barrier Property):

Using a press sheet of the hydrogenated block copolymer or the block copolymer having a thickness of 0.12 mm, the gas barrier property (g/m$^2$·24 h) was measured by infrared ray sensor method in accordance with JIS K7129 B method (MOCON method).

Evaluation of Hydrogenated Block Copolymer or Block Copolymer

Example 1

To a stainless steel autoclave with a stirring device, a solution consisting of 25 parts by mass of a styrene-isobutylene-styrene copolymer having a polystyrene block content ratio (sometimes called a PS content below) of 30% by mass, weight average molecular weight (Mw)=111,000 and number average molecular weight (Mn)=82,100 (sometimes called (A-1) below) and 75 parts by mass of tetrahydrofuran, and 4 parts by mass of 5 mass % palladium-supported activated carbon catalyst as the hydrogenation catalyst were put and mixed. The inside of the reactor was substituted with hydrogen gas, hydrogen gas was further supplied while the solution was stirred and hydrogenation reaction was conducted for 4.5 hours at 170° C. and under 10 MPa.

After the completion of the hydrogenation reaction, the reaction liquid was diluted with 100 parts by mass of tetrahydrofuran, the solution was filtrated and the hydrogenation catalyst was removed. The filtrate was poured into 1,200 parts by mass of methanol while the solution was stirred, and the precipitated hydrogenated block copolymer was separated by filtration and then dried with a reduced-pressure drier.

The hydrogenated block copolymer thus obtained was represented by the following formula, the weight average molecular weight (Mw) was 103,000 and the number average molecular weight (Mn) was 78,200 (Mw/Mn=1.3). Further, the hydrogenation rate was 97%. This hydrogenated block copolymer is sometimes called (X-1) below.

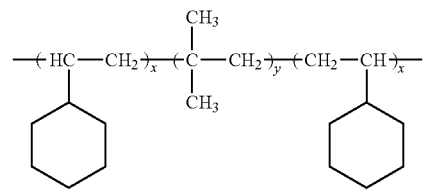

[Chem. 5]

The hydrogenated block copolymer (X-1) obtained was evaluated based on the measurement methods of (6) and (7) above.

Further, the hydrogenated block copolymer (X-1) obtained was injection molded using an injection molding machine (an injection molding unit was connected to Xplore micro compounder manufactured by DSM) with a cylinder temperature of 220° C. and a mold temperature of 40° C. and a sample piece of 80 mm×30 mm with a thickness of 2 mm was produced. Using this sample piece, the evaluation was conducted based on the measurement methods of (3) to (5) above. The results are shown in Table 1.

Example 2

A hydrogenated block copolymer was obtained in the same manner as in Example 1 except that a styrene-isobutylene-styrene copolymer (A-2) having a polystyrene block content ratio of 30% by mass, weight average molecular weight (Mw) =70,000 and number average molecular weight (Mn)=57,000 was used and the hydrogenation reaction time was changed to 3.5 hours. The weight average molecular weight (Mw) of the hydrogenated block copolymer obtained was 66,000 and the number average molecular weight (Mn) was 54,000 (Mw/Mn=1.2). Further, the hydrogenation rate was 96%.

The hydrogenated block copolymer obtained was evaluated based on the measurement method of (6) above.

In addition, the hydrogenated block copolymer obtained was injection molded using the same injection molding machine as that of Example 1 with a cylinder temperature of 180° C. and a mold temperature of 40° C. and a sample piece of 80 mm×30 mm with a thickness of 2 mm was produced. Regarding the sample piece obtained, the evaluations of (3) to (5) above were conducted. The results are shown in Table 1.

Example 3

A hydrogenated block copolymer was obtained in the same manner as in Example 1 except that a styrene-isobutylene-styrene copolymer having a polystyrene block content ratio of 15% by mass, weight average molecular weight (Mw) =112,000 and number average molecular weight (Mn)=93,600 (sometimes called A-3 below) was used and the hydrogenation reaction time was changed to 4 hours. The weight average molecular weight (Mw) of the hydrogenated block copolymer obtained was 108,000 and the number average molecular weight (Mn) was 89,800 (Mw/Mn=1.2). Further, the hydrogenation rate was 96%.

The hydrogenated block copolymer obtained was evaluated based on the measurement method of (6) above.

In addition, the hydrogenated block copolymer obtained was injection molded using the same injection molding machine as that of Example 1 with a cylinder temperature of 190° C. and a mold temperature of 40° C. and a sample piece of 80 mm×30 mm with a thickness of 2 mm was produced.

The sample piece obtained was evaluated based on the measurement methods of (3) to (5) above. The results are shown in Table 1.

Example 4

A hydrogenated block copolymer was obtained in the same manner as in Example 1 except that a styrene-isobutylene-styrene copolymer having a polystyrene block content ratio of 50% by mass, weight average molecular weight (Mw)=67,400 and number average molecular weight (Mn)=46,200 (sometimes called A-4 below) was used. The weight average molecular weight (Mw) of the hydrogenated block copolymer obtained was 59,100 and the number average molecular weight (Mn) was 41,500 (Mw/Mn=1.4). Further, the hydrogenation rate was 94%.

The hydrogenated block copolymer obtained was evaluated based on the measurement method of (6) above.

In addition, the hydrogenated block copolymer obtained was injection molded using the same injection molding machine as that of Example 1 with a cylinder temperature of 190° C. and a mold temperature of 40° C. and a sample piece of 80 mm×30 mm with a thickness of 2 mm was produced. The sample piece obtained was evaluated based on the measurement methods of (3) to (5) above. The results are shown in Table 1.

Comparative Example 1

The styrene-isobutylene-styrene copolymer (A-1) in Example 1 was evaluated based on the measurement methods of (6) and (7) above.

Further, injection molding was conducted in the same manner as in Example 1 except that the hydrogenation of the styrene-isobutylene-styrene copolymer (A-1) was not conducted and (A-1) was directly injection molded with a cylinder temperature of 220° C. and a mold temperature of 40° C. However, because molding was not possible due to the bad fluidity, the cylinder temperature was changed to 250° C. to conduct injection molding and a sample piece of 80 mm×30 mm with a thickness of 2 mm was produced. The sample piece obtained was evaluated based on the measurement methods of (3) to (5) above. The results are shown in Table 1.

Comparative Example 2

The styrene-isobutylene-styrene copolymer (A-2) of Example 2 was evaluated based on the measurement method of (6) above.

Further, injection molding was conducted in the same manner as in Example 2 except that the hydrogenation of the styrene-isobutylene-styrene copolymer (A-2) was not conducted and (A-2) was directly injection molded with a cylinder temperature of 200° C. and a mold temperature of 40° C., and a sample piece of 80 mm×30 mm with a thickness of 2 mm was produced. Regarding the sample piece obtained, the evaluations of (3) to (5) above were conducted. The results are shown in Table 1.

Comparative Example 3

The styrene-isobutylene-styrene copolymer (A-3) of Example 3 was evaluated based on the measurement method of (6) above.

Further, injection molding was conducted in the same manner as in Example 3 except that the hydrogenation of the styrene-isobutylene-styrene copolymer (A-3) was not conducted and (A-3) was directly injection molded with a cylinder temperature of 220° C. and a mold temperature of 40° C., and a sample piece of 80 mm×30 mm with a thickness of 2 mm was produced. Regarding the sample piece obtained, the evaluations of (3) to (5) above were conducted. The results are shown in Table 1.

Comparative Example 4

The styrene-isobutylene-styrene copolymer (A-4) of Example 4 was evaluated based on the measurement method of (6) above.

Further, injection molding was conducted in the same manner as in Example 4 except that the hydrogenation of the styrene-isobutylene-styrene copolymer (A-4) was not conducted and (A-4) was directly injection molded with a cylinder temperature of 210° C. and a mold temperature of 40° C., and a sample piece of 80 mm×30 mm with a thickness of 2 mm was produced. Regarding the sample piece obtained, the evaluations of (3) to (5) above were conducted. The results are shown in Table 1.

Comparative Example 5

To a stainless steel autoclave with a stirring device, a solution consisting of 25 parts by mass of a styrene-ethylene.butylene-styrene copolymer having a polystyrene block content ratio of 30% by mass, weight average molecular weight (Mw) =70,600 and number average molecular weight (Mn)=65,000 (sometimes called B-1 below) and 75 parts by mass of tetrahydrofuran, and 6 parts by mass of 5 mass % palladium-supported activated carbon catalyst as the hydrogenation catalyst were put and mixed. The inside of the reactor was substituted with hydrogen gas, hydrogen gas was further supplied while the solution was stirred and hydrogenation reaction was conducted for 5.5 hours at 170° C. and under 10 MPa. In this regard, the butylene above means n-butylene and the butylene described in the present Examples means n-butylene when there is no description.

After the completion of the hydrogenation reaction, the weight average molecular weight (Mw) of the hydrogenated block copolymer obtained was 68,200 and the number average molecular weight (Mn) was 63,000 (Mw/Mn=1.1). Further, the hydrogenation rate was 99%. The hydrogenated block copolymer obtained was evaluated based on the measurement methods of (6) and (7) above.

In addition, a sample piece of 80 mm×30 mm with a thickness of 2 mm was produced in the same manner as in Example 1 except that the hydrogenated block copolymer obtained was injection molded with a cylinder temperature of 220° C. and a mold temperature of 40° C. The sample piece obtained was evaluated based on the measurement methods of (3) to (5) above. The results are shown in Table 2.

Comparative Example 6

The styrene-ethylene.butylene-styrene copolymer (B-1) of Comparative Example 5 was evaluated based on the measurement methods of (6) and (7) above.

Further, a sample piece of 80 mm×30 mm with a thickness of 2 mm was produced in the same manner as in Example 1 except that the hydrogenation of the styrene-ethylene.butylene-styrene copolymer (B-1) was not conducted and (B-1) was directly injection molded with a cylinder temperature of 270° C. and a mold temperature of 40° C. Regarding the sample piece obtained, the evaluations of (3) to (5) above were conducted. The results are shown in Table 2.

Comparative Example 7

To a stainless steel autoclave with a stirring device, a solution consisting of 23 parts by mass of a styrene-ethylene.butylene-styrene copolymer having a polystyrene block content ratio of 30% by mass, weight average molecular weight (Mw)=94,300 and number average molecular weight (Mn)=86,500 (sometimes called B-2 below) and 77 parts by mass of tetrahydrofuran, and 6 parts by mass of 5 mass % palladium-supported activated carbon catalyst as the hydrogenation catalyst were put and mixed. The inside of the reactor was substituted with hydrogen gas, hydrogen gas was further supplied while the solution was stirred and hydrogenation reaction was conducted for 7 hours at 170° C. and under 10 MPa.

After the completion of the hydrogenation reaction, the weight average molecular weight (Mw) of the hydrogenated block copolymer obtained was 90,500 and the number average molecular weight (Mn) was 82,400 (Mw/Mn=1.1). Further, the hydrogenation rate was 92%. The hydrogenated block copolymer obtained was evaluated based on the measurement method of (6) above.

In addition, a sample piece of 80 mm×30 mm with a thickness of 2 mm was produced in the same manner as in Example 1 except that the hydrogenated block copolymer obtained was injection molded with a cylinder temperature of 240° C. and a mold temperature of 40° C. Regarding the sample piece obtained, the evaluations of (3) to (5) above were conducted. The results are shown in Table 2.

Comparative Example 8

Although the styrene-ethylene.butylene-styrene copolymer (B-2) of Comparative Example 7 was evaluated based on the measurement method of (6) above, the measurement was not possible because the fluidity was bad.

Further, although the styrene-ethylene.butylene-styrene copolymer (B-2) was directly injection molded with a cylinder temperature of 270° C. and a mold temperature of 40° C. without conducting the hydrogenation of (B-2), molding was not possible because the fluidity was bad.

Comparative Example 9

To a stainless steel autoclave with a stirring device, a solution consisting of 25 parts by mass of a styrene-ethylene.propylene-styrene copolymer having a polystyrene block content ratio of 30% by mass, weight average molecular weight (Mw)=73,900 and number average molecular weight (Mn)=69,100 (sometimes called B-3 below) and 75 parts by mass of tetrahydrofuran, and 6 parts by mass of 5 mass % palladium-supported activated carbon catalyst as the hydrogenation catalyst were put and mixed. The inside of the reactor was substituted with hydrogen gas, hydrogen gas was further supplied while the solution was stirred and hydrogenation reaction was conducted for 5 hours at 170° C. and under 10 MPa.

After the completion of the hydrogenation reaction, the weight average molecular weight (Mw) of the hydrogenated block copolymer obtained was 71,000 and the number average molecular weight (Mn) was 66,000 (Mw/Mn=1.1). Further, the hydrogenation rate was 97%. The hydrogenated block copolymer obtained was evaluated based on the measurement method of (6) above.

In addition, a sample piece of 80 mm×30 mm with a thickness of 2 mm was produced in the same manner as in Example 1 except that the hydrogenated block copolymer obtained was injection molded with a cylinder temperature of 210° C. and a mold temperature of 40° C. Regarding the sample piece obtained, the evaluations of (3) to (5) above were conducted. The results are shown in Table 2.

Comparative Example 10

The styrene-ethylene.propylene-styrene copolymer (B-3) of Comparative Example 9 was evaluated on the measurement method of (6) above.

Further, a sample piece of 80 mm×30 mm with a thickness of 2 mm was produced in the same manner as in Example 1 except that the hydrogenation of the styrene-ethylene.propylene-styrene copolymer (B-3) was not conducted and (B-3) was directly injection molded with a cylinder temperature of 260° C. and a mold temperature of 40° C. Regarding the sample piece obtained, the evaluations of (3) to (5) above were conducted. The results are shown in Table 2.

TABLE 1

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Raw material | Kind | A-1 | A-2 | A-3 | A-4 | A-1 | A-2 | A-3 | A-4 |
| | PS content (mass %) | 30 | 30 | 15 | 50 | 30 | 30 | 15 | 50 |
| | Mw | 111000 | 70000 | 112000 | 67400 | 111000 | 70000 | 112000 | 67400 |
| | Mn | 82100 | 57000 | 93600 | 46200 | 82100 | 57000 | 93600 | 46200 |
| Hydride | Mw | 103000 | 66000 | 108000 | 59100 | — | — | — | — |
| | Mn | 78200 | 54000 | 89800 | 41500 | — | — | — | — |
| Hydrogenation rate (%) | | 97 | 96 | 96 | 94 | Not hydrogenated | Not hydrogenated | Not hydrogenated | Not hydrogenated |
| Total haze (%) | | 3.5 | 9.5 | 21.1 | 10.3 | 96.4 | 84.8 | 97 | 43.8 |
| Internal haze (%) | | 3.8 | 5.2 | 5.0 | 4.8 | 13.1 | 9.3 | 8.1 | 33.7 |
| MFR (g/10 minutes) | | 6.2 | 101 | 25.0 | 51.7 | 0.06 | 5.9 | 0.3 | 11.8 |
| A hardness | | 74 | 65 | 37 | 97 | 67 | 56 | 39 | 96 |
| Gas barrier property (water vapor barrier property) (g/(m² · 24 h)) | | 2.3 | — | — | — | 5.5 | — | — | — |

TABLE 2

|  |  | Comparative Example 5 | Comparative Example 6 | Comparative Example 7 | Comparative Example 8 | Comparative Example 9 | Comparative Example 10 |
|---|---|---|---|---|---|---|---|
| Raw material | Kind | B-1 | B-1 | B-2 | B-2 | B-3 | B-3 |
|  | PS content (mass %) | 30 | 30 | 30 | 30 | 30 | 30 |
|  | Mw | 70600 | 70600 | 94300 | 94300 | 73900 | 73900 |
|  | Mn | 65000 | 65000 | 86500 | 86500 | 69100 | 69100 |
| Hydride | Mw | 68200 | — | 90500 | — | 71000 | — |
|  | Mn | 63000 | — | 82400 | — | 66000 | — |
| Hydrogenation rate (%) |  | 99 | Not hydrogenated | 92 | Not hydrogenated | 97 | Not hydrogenated |
| Total haze (%) |  | 11.7 | 4.9 | 12.2 | Molding impossible | 7.3 | 95.3 |
| Internal haze (%) |  | 6.3 | 3.6 | 15 | Molding impossible | 15.4 | 13 |
| MFR (g/10 minutes) |  | 25.2 | 1.8 | 2.7 | Measurement impossible | 35.6 | 1.2 |
| A hardness |  | 79 | 73 | 80 | Molding impossible | 73 | 73 |
| Gas barrier property (water vapor barrier property) (g/(m$^2$ · 24 h)) |  | 16 | 25 | — | — | — | — |

From the results above, in comparison with the vinyl aromatic block copolymers that were not hydrogenated (Comparative Examples 1 to 4), the hydrogenated block copolymers of Examples 1 to 4 had improved injection moldability (total haze) and transparency (internal haze) and were excellent in the heat resistance.

Further, when Example 1 and Comparative Example 1 are compared, it can be understood that the gas barrier property also improves by hydrogenation.

Furthermore, it can be understood that the balance in a transparency and gas barrier property is excellent, in comparison with the hydrogenated block copolymers having an ethylene.butylene block or an ethylene.propylene block instead of an isobutylene block (Comparative Examples 5, 7 and 9). On the other hand, it can be understood that the transparency of a block copolymer having an isobutylene block improves by hydrogenation (Examples 1 to 4 and Comparative Examples 1 to 4), while the transparency of a block copolymer having an ethylene.butylene block or an ethylene.propylene block deteriorates by hydrogenation (Comparative Examples 5, 6, 9 and 10).

<Evaluation of Resin Composition>

The physical properties of the resin compositions shown below were measured in accordance with the following methods.

(9) Haze and Total Light Transmittance

Based on JIS K7105, the total light transmittance and diffuse transmittance were measured and the haze was calculated by the following equation. The transparency is regarded to be excellent when the have value is smaller and the total light transmittance is larger.

[Haze]=[[Diffuse Transmittance]/[Total Light Transmittance]]×100

(10) Gas Barrier Property

Using a film having a thickness of 0.1 mm or 0.12 mm, the gas barrier property (water vapor barrier property) (g/m$^2$·24 h) was determined by infrared ray sensor method in accordance with JIS K7129 B method (MOCON method). The gas barrier property is regarded to be excellent when the gas barrier property value is smaller.

(11) Tensile Elastic Modulus

Based on JIS K7113, a film sample piece having a length of 400 mm, a width of 10 mm and a thickness of 0.1 mm was produced in such a way that the lateral direction became the measurement direction, and the tensile elastic modulus was measured using Autograph AG-1000 manufactured by Shimadzu Corporation under a condition of a temperature of 23° C. and a tensile rate of 1 mm/min. In this regard, the tensile elastic modulus is an index of the flexibility and the flexibility is regarded to be excellent when the tensile elastic modulus is smaller.

Example 5

Pellets of a resin composition was obtained by melt-kneading 50 parts by mass of the hydrogenated block copolymer (X-1) obtained in Example 1 and 50 parts by mass of a propylene resin ("ZELAS (registered trademark) 7025" manufactured by Mitsubishi Chemical Corporation, a propylene-ethylene copolymer having an ethylene content of 7% by mass (10% by mol)) with Labo Plasto Mill 20C 200 type manufactured by Toyo Seiki Co., Ltd. at 200° C. with a rotation speed of 150 rpm for 3 minutes. The propylene resin "ZELAS (registered trademark) 7025" is sometimes called (Z-1) below.

The pellets of the resin composition obtained above were compacting molded with NSF-100 type single-acting compacting molding machine manufactured by Shinto Metal Industries Corporation at 200° C. under a condition of preheating for 2 minutes, pressing for 5 minutes and cool-pressing for 3 minutes, and a film having a thickness of 0.2 mm or 0.12 mm was formed.

The evaluation of (9) above was conducted using the film having a thickness of 0.2 mm obtained and the evaluation of (10) above was conducted using the film having a thickness of 0.12 mm obtained. The evaluation results are shown in Table 3.

Comparative Example 11

The preparation of the resin composition and the film formation were conducted in the same manner as in Example 5 except that the styrene-isobutylene-styrene copolymer (A-1)

of Comparative Example 1 that was not hydrogenated was used instead of the hydrogenated block copolymer obtained in Example 1 and (A-1) was directly melt-kneaded with the propylene resin (Z-1). The evaluation results are shown in Table 3.

TABLE 3

|  |  |  |  | Example 5 | Comparative Example 11 |
|---|---|---|---|---|---|
| Resin composition | (X-1) |  | Parts by mass | 50 | — |
|  | (Z-1) |  | Parts by mass | 50 | 50 |
|  | (A-1) |  | Parts by mass | — | 50 |
| Evaluation | Transparency | Total light transmittance | % | 91 | 87 |
|  | Gas barrier property | Water vapor barrier property | g/m² · 24 h | 4.0 | 4.2 |

From Table 3, it can be understood that the resin composition of the present invention is excellent in both transparency and gas barrier property. On the other hand, Comparative Example 11 using a block copolymer which was not hydrogenated is inferior to Example 5 regarding the transparency and the gas barrier property.

Example 6

A film having a thickness of 0.1 mm was obtained by: extruding 15 parts by mass of the hydrogenated block copolymer (X-1) obtained in Example 1 and 85 parts by mass of a compound which is a polymer having the repeating unit represented by the formula (2) above ($R^3$ and $R^4$ form a cyclopentyl ring structure and d is 0, in which the repeating unit of the formula (2) corresponds to the hydrogen additive of the ring-opened polymer of dicyclopentadiene represented by the formula (3) above) and which contains the hydrogen additive of the ring-opened polymer of dicyclopentadiene represented by the formula (3) above with a ratio of 85% by mol based on the whole molecule ("Zeonor (registered trademark) 1020R" manufactured by Zeon Corporation (MFR 2.0 g/minute (230° C., 21.2 N))), with a biaxial extruder KZW15 (screw diameter 15 mmφ, same direction biaxial L/D=45) manufactured by Technovel Corporation in which a coat-hanger-type die with a width of 150 mm and a lip opening of 0.8 mm was provided at the tip, with a setting temperature of 260° C. and a rotation speed of 500 rpm; and taking the film with a cooling roll of 150 mmφ with a roll temperature of 10° C. and a line speed of 5 m/min. The "Zeonor (registered trademark) 1020R" is sometimes called (Z-2) below.

<Evaluation>

Using the film obtained, the evaluations of (9) to (11) above were conducted and the results are shown in Table 4.

Comparative Example 12

The preparation of the resin composition and the film formation were conducted in the same manner as in Example 6 except that the styrene-isobutylene-styrene copolymer (A-1) of Comparative Example 1 that was not hydrogenated was used instead of the hydrogenated block copolymer (X-1) obtained in Example 1 and (A-1) was directly melt-kneaded with "Zeonor (registered trademark) 1020R" (Z-2) in Example 6. The evaluation results are shown in Table 4.

TABLE 4

|  |  |  |  | Example 6 | Comparative Example 12 |
|---|---|---|---|---|---|
| Resin composition | (X-1) |  | Parts by mass | 15 | — |
|  | (Z-2) |  | Parts by mass | 85 | 85 |
|  | (A-1) |  | Parts by mass | — | 15 |
| Evaluation | Transparency | Haze | % | 4 | 17 |
|  |  | Total light transmittance | % | 91 | 89 |
|  | Flexibility | Tensile elastic modulus | MPa | 1700 | 1700 |
|  | Gas barrier property | Gas barrier property | g/m² · 24 h | 1.8 | 2.4 |

From Table 4, it can be understood that the resin composition of the present invention is excellent in the transparency and the gas barrier property.

On the other hand, the transparency and the gas barrier property of Comparative Example 12 using a block copolymer which was not hydrogenated are inferior to those of Example 6.

Example 7

Pellets were obtained by melt-kneading 20 parts by mass of the hydrogenated block copolymer (X-1) obtained in Example 1 and 80 parts by mass of the hydrogenated styrene-butadiene block copolymer (Z-3) below using a biaxial extruder having a cylinder diameter of 30 mm (manufactured by Ikegai Co. Ltd., PCM30 type) with a setting temperature of 250° C.

In this regard, the hydrogenated styrene-butadiene block copolymer below is sometimes called (Z-3).

<Hydrogenated Styrene-Butadiene Block Copolymer>

A copolymer which was a hydride of a pentablock copolymer having a PS-PB-PS-PB-PS chain of polystyrene block (PS) and polybutadiene block (PB) and had MFR (240° C., 49 N)=96 g/minute and the following structure determined by $^{13}$C-NMR was used.

Cyclohexylethyl segment: 66% by mol

Tetramethylene segment: 31% by mol

Butylene segment: 3% by mol

The pellets of the resin composition obtained above were injection molded using an injection molding machine with a mold clamping pressure of 130 t (manufactured by Toshiba Machine Co., Ltd, IS-130 type) with a lower hopper temperature of 175° C., cylinder temperature of 240° C., nozzle temperature of 230° C. and mold temperature of 40° C. to form a sample piece of 80 mm×30 mm with a thickness of 2 mm.

The pellets of the resin composition obtained above were compacting molded with NSF-100 type single-acting compacting molding machine manufactured by Shinto Metal Industries Corporation at 230° C. under a condition of preheating for 2 minutes, pressing for 5 minutes and cool-pressing for 3 minutes, and a film having a thickness of 0.1 mm was formed.

The evaluation of (9) above was conducted using the injection molded sample piece obtained and the evaluation of (10) above was conducted using the film obtained. The results are shown in Table 5.

Comparative Example 13

The preparation of the resin composition, injection molding and compacting molding were conducted in the same manner except that the styrene-isobutylene-styrene copolymer (A-1) of Comparative Example 1 that was not hydrogenated was used instead of the hydrogenated block copolymer (X-1) obtained in Example 1 and (A-1) was directly melt-kneaded with the hydrogenated styrene-butadiene block copolymer (Z-3) without hydrogenation in Example 7. The evaluation results are shown in Table 5.

Comparative Example 14

The preparation of the resin composition, injection molding and compacting molding were conducted in the same manner except that the styrene-ethylene.butylene.styrene-styrene copolymer (Z-4) below was used instead of the hydrogenated block copolymer (X-1) obtained in Example 1 in Example 7. The evaluation results are shown in Table 5.

In this regard, the styrene-ethylene.butylene.styrene-styrene copolymer below is sometimes called (Z-4).

<Styrene-Ethylene.Butylene.Styrene-Styrene Copolymer>

A1536HU manufactured by Kraton Performance Polymers Inc., styrene content: 40% by mass Weight average molecular weight (Mw)=127,000

Number average molecular weight (Mn)=110,000

TABLE 5

|  |  |  |  | Example 7 | Comparative Example 13 | Comparative Example 14 |
|---|---|---|---|---|---|---|
| Resin composition | (X-1) |  | Parts by mass | 20 | — | — |
|  | (Z-3) |  | Parts by mass | 80 | 80 | 80 |
|  | (A-1) |  | Parts by mass | — | 20 | — |
|  | (Z-4) |  | Parts by mass | — | — | 20 |
| Evaluation | Transparency | Haze | % | 1.5 | 89 | 60 |
|  |  | Total light transmittance | % | 91 | 54 | 76 |
|  | Gas barrier property | Gas barrier property | g/m$^2$ · 24 h | 2.7 | 3.5 | 7.4 |

Example 8

A film having a thickness of 0.1 mm was obtained by: extruding 80 parts by mass of the hydrogenated block copolymer (X-1) obtained in Example 1 and 20 parts by mass of the hydrogenated styrene-butadiene block copolymer (Z-3) used in Example 7, with a biaxial extruder KZW15 (screw diameter 15 mmϕ, same direction biaxial L/D=45) manufactured by Technovel Corporation in which a coat-hanger-type die with a width of 150 mm and a lip opening of 0.8 mm was provided at the tip, with a setting temperature of 260° C. and a rotation speed of 500 rpm; and taking the film with a cooling roll of 150 mmϕ with a roll temperature of 10° C. and a line speed of 5 m/min.

Using the film obtained, the evaluations of (9) to (11) above were conducted and the results are shown in Table 6.

Examples 9 to 11 and Comparative Example 15-18

The film formation of the resin composition and the evaluation were conducted in the same manner as in Example 8 except that the compositions of the resin compositions were changed as shown in Table 6 in Example 8. These results are shown in Table 6.

TABLE 6

| | | | Example 8 | Example 9 | Example 10 | Example 11 | Comparative Example 15 | Comparative Example 16 | Comparative Example 17 | Comparative Example 18 |
|---|---|---|---|---|---|---|---|---|---|---|
| Resin composition | (X-1) | Parts by mass | 20 | 40 | 60 | 80 | — | — | — | — |
| | (Z-3) | Parts by mass | 80 | 60 | 40 | 20 | 80 | 60 | 80 | 60 |
| | (A-1) | Parts by mass | — | — | — | — | 20 | 40 | — | — |
| | (Z-4) | Parts by mass | — | — | — | — | — | — | 20 | 40 |
| Evaluation | Transparency | Haze % | 2.1 | 2.5 | 1.7 | 4.3 | 17 | 29 | 5.4 | 9.2 |
| | | Total light transmittance % | 92 | 91 | 92 | 92 | 89 | 86 | 90 | 88 |
| | Gas barrier property | Water vapor permeability g/m² · 24 h | 2.8 | 2.6 | 2.5 | 2.4 | 3.5 | 4.1 | 7.4 | 13 |
| | Flexibility | Tensile elastic modulus MPa | 1050 | 970 | 400 | 66 | 1170 | 880 | 1470 | 940 |

From Table 5, it can be understood that Example 7 using the resin composition of the present invention is excellent in both transparency and gas barrier property. On the other hand, Comparative Example 13 using a block copolymer which was not hydrogenated and Comparative Example 14 using a styrene-ethylene.butylene.styrene-styrene copolymer have inferior transparency and gas barrier property as compared to Example 7. Regarding the transparency in particular, though molded pieces having a thickness of 2 mm were used in the evaluation of Table 5, it can be understood that the transparency of Example 7 is significantly excellent in comparison with those of Comparative Examples 13 and 14.

Further, from Table 6, it can be understood that Examples 8 to 11 using the resin compositions of the present invention are excellent in both transparency and gas barrier property in a wide flexibility range in comparison to Comparative Examples 15 to 18. Further, the flexibility of the resin composition of the present invention can be controlled in a wide range by the combination of the composition and thus the resin composition can be preferably used in a wide range of applications.

Although the present invention has been explained in detail and with reference to specific embodiments, it is obvious to one skilled in the art that various changes and modifications can be made without departing from the spirit and the scope of the present invention. The present application is based on Japanese Patent Application filed on Sep. 29, 2011 (Patent Application 2011-214648), Japanese Patent Application filed on Jul. 18, 2012 (Patent Application 2012-159631), Japanese Patent Application filed on Jul. 18, 2012 (Patent Application 2012-159632) and Japanese Patent Application filed on Jul. 18, 2012 (Patent Application 2012-159633), and the contents thereof are incorporated here as a reference.

The invention claimed is:

1. A hydrogenated block copolymer comprising:
(A) a hydrogenated vinyl aromatic polymer block; and
(B) a polymer block mainly comprising isobutylene,
wherein the polymer block (B) comprises 70% by mass or more of isobutylene as a monomer component.

2. The hydrogenated block copolymer as claimed in claim 1, wherein the hydrogenated block copolymer has a weight average molecular weight of 10,000 or more and 200,000 or less.

3. The hydrogenated block copolymer as claimed in claim 1, wherein the hydrogenated vinyl aromatic polymer block (A) is a hydrogenated polystyrene block in which the aromatic ring is hydrogenated.

4. The hydrogenated block copolymer as claimed in claim 1, wherein the hydrogenation rate of the aromatic ring of the hydrogenated vinyl aromatic polymer block (A) is 50% by mol or more.

5. The hydrogenated block copolymer as claimed in claim 1, wherein the hydrogenated block copolymer comprises two blocks of the hydrogenated vinyl aromatic polymer block (A) and one block of the polymer block (B).

6. The hydrogenated block copolymer as claimed in claim 1, wherein the content ratio of the hydrogenated vinyl aromatic polymer block (A) based on the total mass of the hydrogenated block copolymer is 40% by mass or less.

7. A resin composition comprising the hydrogenated block copolymer described in claim 1.

8. The resin composition as claimed in claim 7, which further comprises a polyolefin containing propylene, the propylene being a main component of the polyolefin.

9. The resin composition as claimed in claim 8, wherein the polyolefin containing propylene is a copolymer of propylene and at least one of ethylene and an olefin having 4 to 8 carbon atoms.

10. The resin composition as claimed in claim 8, wherein the content of the hydrogenated block copolymer is 10 to 90% by mass and the content of the polyolefin containing propylene is 90 to 10% by mass.

11. The resin composition as claimed in claim 7, further comprising at least one amorphous polyolefin selected from a copolymer of ethylene and a cyclic olefin and a hydrogen additive of a ring-opened polymer of a cyclic olefin.

12. The resin composition as claimed in claim 11, wherein the content of the hydrogenated block copolymer is 5 to 90% by mass and the content of the at least one amorphous polyolefin is 95 to 10% by mass.

13. The resin composition as claimed in claim 7, which further comprises at least one polymer selected from a hydrogenated vinyl aromatic polymer and a block copolymer having a hydrogenated vinyl aromatic polymer block and a block of a polymer mainly containing a hydrogenated conjugate diene.

14. The resin composition as claimed in claim 13, wherein the content of the hydrogenated block copolymer is 5 to 90% by mass and the content of the at least one polymer is 95 to 10% by mass.

15. A film comprising the resin composition described in claim 7.

16. A container comprising the resin composition described in claim 7.

* * * * *